(12) United States Patent
Satou et al.

(10) Patent No.: US 7,926,930 B2
(45) Date of Patent: Apr. 19, 2011

(54) INKJET INK

(75) Inventors: Hiroyuki Satou, Ichihara (JP); Setsuo Itami, Ichihara (JP); Takayuki Hattori, Ichihara (JP)

(73) Assignee: Chisso Corporation, Osaka (JP)

(*) Notice: Subject to any disclaimer, the term of this patent is extended or adjusted under 35 U.S.C. 154(b) by 0 days.

(21) Appl. No.: 11/896,297

(22) Filed: Aug. 30, 2007

(65) Prior Publication Data

US 2008/0085361 A1 Apr. 10, 2008

(30) Foreign Application Priority Data

Aug. 31, 2006 (JP) ................................. 2006-235336
Jul. 6, 2007 (JP) ................................. 2007-178064

(51) Int. Cl.
*C09D 11/10* (2006.01)

(52) U.S. Cl. ..................... 347/100; 106/31.14; 528/350; 528/353; 523/160; 523/161

(58) Field of Classification Search .................. 437/100; 106/31.14; 528/350, 353; 347/100; 523/160, 523/161

See application file for complete search history.

(56) References Cited

U.S. PATENT DOCUMENTS

| | | | | |
|---|---|---|---|---|
| 5,171,828 A | * | 12/1992 | Meterko et al. | 528/353 |
| 6,693,162 B2 | * | 2/2004 | Tsuji et al. | 528/170 |
| 6,746,730 B1 | | 6/2004 | Tanioka et al. | 428/1.1 |
| 2005/0143534 A1 | * | 6/2005 | Dueber et al. | 525/476 |
| 2006/0124925 A1 | | 6/2006 | Kondo et al. | 257/40 |
| 2007/0281091 A1 | * | 12/2007 | Kowalski et al. | 427/256 |

FOREIGN PATENT DOCUMENTS

| | | |
|---|---|---|
| EP | JP 0 538 075 A1 | 4/1993 |
| JP | 2000-039714 | 2/2000 |
| JP | 2003-213165 | 7/2003 |
| JP | 2003-238683 | 8/2003 |
| JP | 2004-094118 | 3/2004 |
| JP | 2006-131730 | 5/2006 |

OTHER PUBLICATIONS

L. B. Rothman, Journal of Electrochemical Society, vol. 127, 1980, pp. 2216-2220.*
European Search Report dated Nov. 8, 2007 for related European Application No. EP 07 01 6910.
X002457022 Derwent Publications Ltd., London, GB; AN, Jul. 21, 1999-462443 (Abstract).
X002457023 Derwent Publications Ltd., London, GB; AN, Aug. 29, 1995-332675 (Abstract).

* cited by examiner

*Primary Examiner* — David Wu
*Assistant Examiner* — Vu A Nguyen
(74) *Attorney, Agent, or Firm* — Hogan Lovells US LLP

(57) ABSTRACT

The invention relates to a method for manufacturing an inkjet ink including a polyamic acid (A), including a step of at least reacting one or more compounds selected from the group of a monoamine (a3) and a compound having one acid anhydride group (a4) with a compound having two or more acid anhydride groups (a1) and a diamine (a2).

16 Claims, 1 Drawing Sheet

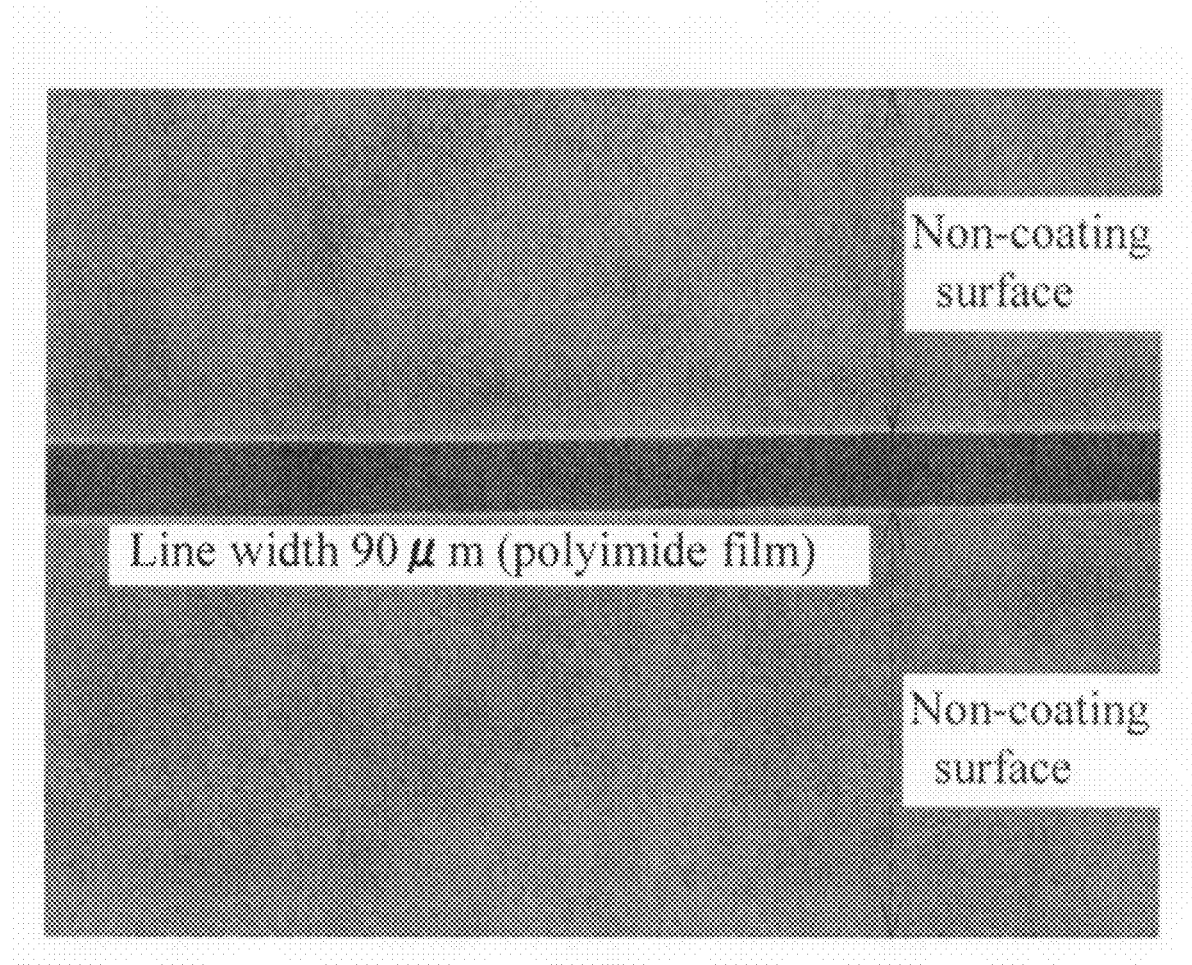

INKJET INK

CROSS REFERENCE TO RELATED APPLICATIONS

This application claims priority under 35 U.S.C. §119 to Japanese Patent Application Nos. JP 2006-235336 (filed Aug. 31, 2006) and JP 2007-178064 (filed Jul. 6, 2007), which applications are expressly incorporated herein by reference in their entirety.

BACKGROUND OF THE INVENTION

1. Field of the Invention

The invention relates to an inkjet ink, and, for example, relates to a polyamic acid composition for forming an insulating film layer in the production of an electronic component, to a polyimide film formed using the composition, to a film substrate on which the polyimide film is formed, and to an electronic component including the film substrate.

2. Related Art

Polyimide is a material that is widely used in the field of electronic communications because of its excellent heat resistance and electrical insulating properties (see, for example, Japanese Laid-Open Patent Applications 2000-039714, 2003-238683, and 2004-094118). When polyimide is used as a film in the desired pattern, the common approach in the past has been to form the pattern by etching or using a photosensitive polyimide, but this requires large amounts of various chemicals, such as a photoresist, developer, etching solution, and release solution, and furthermore it required a complicated process. Consequently, methods have been studied in recent years for forming a film in the desired pattern by inkjet process.

Various kinds of ink have been proposed for inkjet use (such as in Japanese Laid-Open Patent Applications 2003-213165 and 2006-131730), but if an attempt is made to prepare a polyimide-based inkjet ink, the solvent included in the ink is limited to being N-methyl-2-pyrrolidone or another such amide-based solvent, which leads to decreased durability of the inkjet head and to lower jetting accuracy.

Also, since a polyamic acid has relatively large molecules, preparing an ink with the optimum viscosity for use as an inkjet ink requires the proportion of solvent to be increased so as to reduce the polyamic acid content in the ink. This process was a problem in that it reduced the thickness of the film obtained in a single ink jetting.

SUMMARY OF THE INVENTION

There has been a need for an inkjet ink including polyamic acid, which can use a solvent that does not decrease the durability of the inkjet head. There has also been a need for an inkjet ink including a high concentration of polyamic acid, which can form a relatively thick film (at least 1 μm) in a single jetting.

The invention includes, for example, a method for manufacturing an inkjet ink including a polyamic acid (A), including a step of at least reacting one or more compounds selected from the group of a monoamine (a3) and a compound having one acid anhydride group (a4) with a compound having two or more acid anhydride groups (a1) and a diamine (a2), as well as an inkjet ink manufactured by using the manufacturing method.

The invention includes:

(1) An inkjet ink including a polyamic acid (A) having structural units expressed by the following General Formula (1):

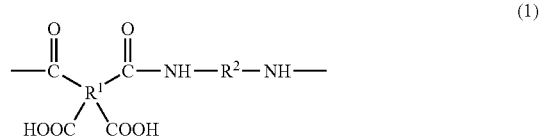

wherein $R^1$ and $R^2$ are each independently a $C_2$ to $C_{100}$ organic group and having at least one molecular terminal group selected from the group of molecular terminal groups expressed by the following General Formulas (21) and (22):

wherein $R^3$ and $R^4$ are each independently a $C_2$ to $C_{10}$ organic group.

The weight average molecular weight of the polyamic acid (A) in the inkjet ink is preferably from approximately 1,000 to approximately 10,000, and more preferably from approximately 1,000 to approximately 4,500, and even more preferably from approximately 1,000 to approximately 3,500.

(2) The inkjet ink according to item (1) above, further including a solvent (B).

(3) The inkjet ink according to item (2) above, wherein the solvent (B) is at least one solvent selected from the group of ethyl lactate, ethanol, ethylene glycol, propylene glycol, glycerol, diethylene glycol dimethyl ether, diethylene glycol diethyl ether, diethylene glycol methylethyl ether, diethylene glycol monoethyl ether acetate, ethylene glycol monobutyl ether, ethylene glycol monoethyl ether acetate, propylene glycol monomethyl ether acetate, methyl 3-methoxypropionate, ethyl 3-ethoxypropionoate, cyclohexanone, and gamma-butyrolactone.

(4) The inkjet ink according to items (2) or (3) above, wherein the solvent (B) does not include greater or equal to approximately 20 wt % amide-based solvent with respect to the total solvent weight.

(5) The inkjet ink according to items (2) or (3) above, wherein the solvent (B) does not include an amide-based solvent.

(6) The inkjet ink according to any of items (1) to (5) above, further including an epoxy resin (C).

(7) The inkjet ink according to item (6) above, wherein the epoxy resin (C) is at least one compound selected from the group of N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, and compounds expressed by the following Formulas (4) to (7):

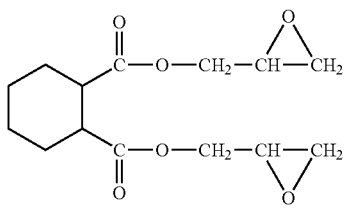

(4)

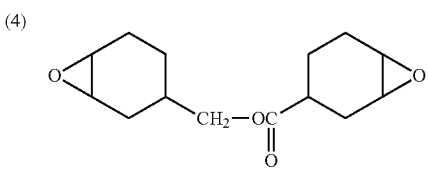

(5)

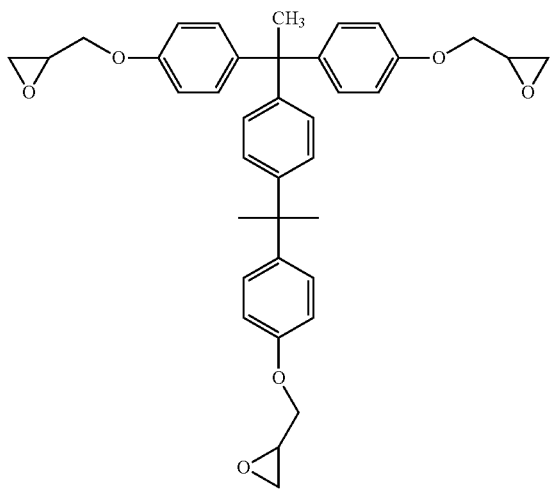

(6)

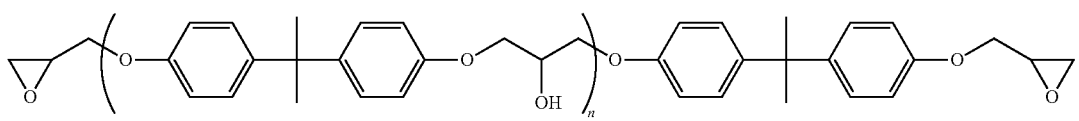

(7)

wherein n is an integer from 0 to 10.

(8) The inkjet ink according to any of items (1) to (7) above, including approximately 5 to approximately 60 weight parts of the polyamic acid (A) per 100 weight parts inkjet ink.

(9) The inkjet ink according to any of items (1) to (7) above, including approximately 5 to approximately 55 weight parts of the polyamic acid (A) per 100 weight parts inkjet ink.

(10) The inkjet ink according to any of items (1) to (7) above, including approximately 20 to approximately 50 weight parts of the polyamic acid (A) per 100 weight parts inkjet ink.

With the inkjet inks according to any of items (8) to (10) above, the viscosity at 250 C is preferably from approximately 1 to approximately 50 mPa·s. Also, with the inkjet inks according to any of items (8) to (10) above, the viscosity at 40° C. is preferably from approximately 1 to approximately 50 mPa·s. With the inkjet inks according to any of items (8) to (10) above, the viscosity at 120° C. is preferably from approximately 1 to approximately 50 mPa·s.

(11) The inkjet ink according to any of items (1) to (10) above, wherein the water content of the inkjet ink is approximately 10,000 ppm or less.

(12) The inkjet ink according to any of items (1) to (10) above, wherein the water content of the inkjet ink is approximately 5,000 ppm or less.

(13) A method for manufacturing an inkjet ink including a polyamic acid (A), including a step of synthesizing the polyamic acid (A) by reacting at least one or more compounds selected from the group of a monoamine (a3) and a compound having one acid anhydride group (a4) with a compound having two or more acid anhydride groups (a1) and a diamine (a2).

(13-1) A method for manufacturing an inkjet ink including a polyamic acid (A), including a step of at least synthesizing the polyamic acid (A) by reacting one or more compounds selected from the group of a monoamine (a3) and a compound having one acid anhydride group (a4) with a compound having two or more acid anhydride groups (a1) and a diamine (a2), wherein the polyamic acid (A) is obtained by using approximately 0.01 to approximately 0.5 mol of the diamine (a2) and approximately 1 to approximately 1.98 mol of the monoamine (a3) per mole of the compound having two or more acid anhydride groups (a1).

(13-2) The method for manufacturing an inkjet ink according to item (13-1) above, wherein the polyamic acid (A) is obtained by using approximately 0.15 to approximately 0.25 mol of the diamine (a2) and approximately 1.5 to approximately 1.7 mol of the monoamine (a3) per mole of the compound having two or more acid anhydride groups (a1).

(13-3) A method for manufacturing an inkjet ink including a polyamic acid (A), including a step of synthesizing the polyamic acid (A) by reacting at least one or more compounds selected from the group of a monoamine (a3) and a compound having one acid anhydride group (a4) with a compound having two or more acid anhydride groups (a1) and a diamine (a2), wherein the polyamic acid (A) is obtained by using approximately 0.01 to approximately 0.5 mol of the compound having two or more acid anhydride groups (a1) and approximately 1 to approximately 1.98 mol of the compound having one acid anhydride group (a4) per mole of the diamine (a2).

(13-4) The method for manufacturing an inkjet ink according to item (13-3) above, wherein the polyamic acid (A) is obtained by using approximately 0.15 to approximately 0.25 mol of the compound having two or more acid anhydride groups (a1) and approximately 1.5 to approximately 1.7 mol of the compound having one acid anhydride group (a4) per mole of the diamine (a2).

(14) The method for manufacturing an inkjet ink according to item (13) above, wherein the compound having two or more acid anhydride groups (a1) is at least one selected from the group of tetracarboxylic dianhydrides expressed by the following General Formula (8):

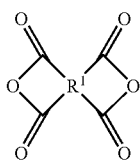
(8)

wherein $R^1$ is a $C_2$ to $C_{100}$ organic group, and copolymers of monomers having an acid anhydride group and other polymerizable monomers.

(15) The method for manufacturing an inkjet ink according to item (14) above, wherein the tetracarboxylic dianhydride is at least one selected from the group of pyromellitic dianhydride, 3,3',4,4'-benzophenonetetracarboxylic dianhydride, 2,2',3,3'-benzophenonetetracarboxylic dianhydride, 2,3,3',4'-benzophenonetetracarboxylic dianhydride, 3,3',4,4'-diphenylsulfonetetracarboxylic dianhydride, 2,2',3,3'-diphenylsulfonetetracarboxylic dianhydride, 2,3,3',4'-diphenylsulfonetetracarboxylic dianhydride, 3,3',4,4'-diphenylethertetracarboxylic dianhydride, 2,2',3,3'-diphenylethertetracarboxylic dianhydride, 2,3,3',4'-diphenyl ether tetracarboxylic dianhydride, 2,2-[bis(3,4-dicarboxyphenyl)]hexafluoropropane dianhydride, ethylene glycol bis(anhydrotrimellitate), cyclobutanetetracarboxylic dianhydride, methylcyclobutanetetracarboxylic dianhydride, cyclopentanetetracarboxylic dianhydride, 1,2,4,5-cyclohexanetetracarboxylic dianhydride, ethanetetracarboxylic dianhydride, and butanetetracarboxylic dianhydride.

(16) The method for manufacturing an inkjet ink according to items (14) or (15) above, wherein the monomer having an acid anhydride group is maleic anhydride.

(17) The method for manufacturing an inkjet ink according to any of items (14) to (16) above, wherein the other polymerizable monomer is at least one selected from the group of styrene, methyl(meth)acrylate, butyl(meth)acrylate, 2-hydroxyethyl(meth)acrylate, benzyl(meth)acrylate, cyclohexyl (meth)acrylate, N-cyclohexylmaleimide, and N-phenylmaleimide.

(18) The method for manufacturing an inkjet ink according to item (13) above, wherein the compound having two or more acid anhydride groups (a1) is at least one selected from the group of a copolymer of styrene and maleic anhydride, pyromellitic dianhydride, 3,3',4,4'-benzophenonetetracarboxylic dianhydride, 3,3',4,4'-diphenylsulfonetetracarboxylic dianhydride, 3,3',4,4'-diphenyl ether tetracarboxylic dianhydride, 2,2-[bis(3,4-dicarboxyphenyl)]hexafluoropropane dianhydride, cyclobutanetetracarboxylic dianhydride, 1,2,4,5-cyclohexanetetracarboxylic dianhydride, and butanetetracarboxylic dianhydride.

(19) The method for manufacturing an inkjet ink according to any of items (13) to (18) above, wherein the diamine (a2) is a diamine expressed by the following General Formula (9):

$$NH_2-R^2-NH_2 \quad (9)$$

wherein $R^2$ is a $C_2$ to $C_{100}$ organic group.

(20) The method for manufacturing an inkjet ink according to any of items (13) to (18) above, wherein the diamine (a2) is at least one selected from the group of 3,3'-diaminodiphenylsulfone, 4,4'-diaminodiphenyl ether, 4,4'-diaminodiphenylmethane, 3,3'-diaminodiphenylmethane, 3,3'-dimethyl-4,4'-diaminodiphenylmethane, 2,2-bis[4-(4-aminophenoxy)phenyl]propane, 2,2-bis[4-(4-aminophenoxy)phenyl]hexafluoropropane, m-phenylenediamine, p-phenylenediamine, m-xylylenediamine, p-xylylenediamine, 2,2'-diaminodiphenylpropane, benzidine, 1,1-bis[4-(4-aminophenoxy)phenyl]cyclohexane, 1,1-bis[4-(4-aminophenoxy)phenyl]-4-methylcyclohexane, bis[4-(4-aminobenzyl) phenyl]methane, 1,1-bis[4-(4-aminobenzyl) phenyl]cyclohexane, 1,1-bis[4-(4-aminobenzyl)phenyl]4-methylcyclohexane, 1,1-bis[4-(4-aminobenzyl)phenyl] methane, and compounds expressed by the following Formula (3):

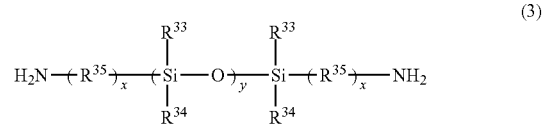
(3)

wherein $R^{33}$ and $R^{34}$ are each independently a $C_1$ to $C_3$ alkyl or phenyl, each $R^{35}$ is independently a methylene, phenylene, or alkyl-substituted phenylene, each x is independently an integer from 1 to 6, and y is an integer from 1 to 70.

(21) The method for manufacturing an inkjet ink according to any of items (13) to (20) above, wherein the monoamine (a3) is an aminosilicon compound.

The above-mentioned aminosilicon compound is preferably at least one selected from the group of 3-aminopropyltrimethoxysilane, 3-aminopropyltriethoxysilane, 3-aminopropylmethyl dimethoxysilane, 3-aminopropylmethyldiethoxysilane, 4-aminobutyltrimethoxysilane, 4-aminobutyl triethoxysilane, 4-aminobutylmethyldiethoxysilane, p-aminophenyltrimethoxysilane, p-aminophenyl triethoxysilane, p-aminophenylmethyldimethoxysilane, p-aminophenylmethyldiethoxysilane, m-aminophenyltrimethoxysilane, and m-aminophenylmethyldiethoxysilane.

(22) The method for manufacturing an inkjet ink according to any of items (13) to (21) above, wherein the compound having one acid anhydride group (a4) is a silicon-containing compound expressed by the following Formula (23):

(23)

wherein $R^{91}$ is a $C_2$ to $C_{100}$ organic group containing silicon, R is a $C_2$ to $C_{100}$ organic group, and $R^{91}$ and $R^{92}$ may be bonded together to form a ring.

The above-mentioned silicon-containing compound is preferably at least one selected from the group of p-(trimethoxysilyl)phenylsuccinic anhydride, p-(triethoxysilyl)phenylsuccinic anhydride, m-(trimethoxysilyl)phenylsuccinic anhydride, m-(triethoxysilyl)phenylsuccinic anhydride, trimethoxysilylpropylsuccinic anhydride, triethoxysilylpropylsuccinic anhydride, compounds expressed by the following Formula (α), and compounds expressed by the following Formula (β).

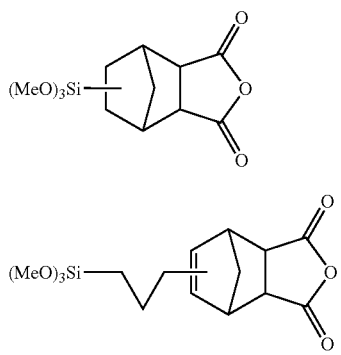

(23) The method for manufacturing an inkjet ink according to any of items (13) to (22) above, wherein the inkjet ink further includes a solvent (B).

(24) The method for manufacturing an inkjet ink according to item (23) above, wherein the solvent (B) is at least one solvent selected from the group of ethyl lactate, ethanol, ethylene glycol, propylene glycol, glycerol, diethylene glycol dimethyl ether, diethylene glycol diethyl ether, diethylene glycol methylethyl ether, diethylene glycol monoethyl ether acetate, ethylene glycol monobutyl ether, ethylene glycol monoethyl ether acetate, propylene glycol monomethyl ether acetate, methyl 3-methoxypropionate, ethyl 3-ethoxypropionate, cyclohexanone, and gamma-butyrolactone.

(25) The method for manufacturing an inkjet ink according to any of items (23) or (24) above, wherein the compound having two or more acid anhydride groups (a1) is at least one selected from the group of 3,3',4,4'-diphenyl ether tetracarboxylic dianhydride and a styrene-maleic anhydride copolymer, the diamine (a2) is at least one selected from the group of 3,3'-diaminodiphenylsulfone, 4,4'-diaminodiphenyl ether, 4,4'-diaminodiphenylmethane, 3,3'-diaminodiphenylmethane, 3,3'-dimethyl-4,4'-diaminodiphenylmethane, 2,2-bis[4-(4-aminophenoxy)phenyl]hexafluoropropane, 2,2'-diaminodiphenylpropane, and compounds expressed by the following Formula (3):

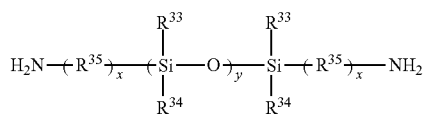

wherein $R^{33}$ and $R^{34}$ are each independently a $C_1$ to $C_3$ alkyl or phenyl, each $R^{35}$ is independently a methylene, phenylene, or alkyl-substituted phenylene, each x is independently an integer from 1 to 6, and y is an integer from 1 to 70, the monoamine (a3) is at least one selected from the group of 3-aminopropyltrimethoxysilane, 3-aminopropyltriethoxysilane, 3-aminopropylmethyldimethoxysilane, 3-aminopropylmethyldiethoxysilane, 4-aminobutyltrimethoxysilane, 4-aminobutyltriethoxysilane, 4-aminobutylmethyldiethoxysilane, p-aminophenyltrimethoxysilane, p-aminophenyltriethoxysilane, p-aminophenylmethyldimethoxysilane, p-aminophenylmethyldiethoxysilane, m-aminophenyltrimethoxysilane, and m-aminophenylmethyldiethoxysilane, the compound having one acid anhydride group (a4) is at least one selected from the group of p-(trimethoxysilyl)phenylsuccinic anhydride, p-(triethoxysilyl)phenylsuccinic anhydride, m-(trimethoxysilyl)phenylsuccinic anhydride, m-(triethoxysilyl)phenylsuccinic anhydride, trimethoxysilylpropylsuccinic anhydride, triethoxysilylpropylsuccinic anhydride, compounds expressed by the following Formula (α), and compounds expressed the following Formula (β):

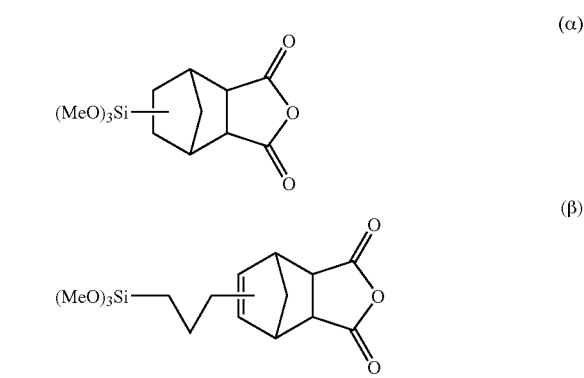

and the solvent (B) is at least one selected from the group of ethyl lactate, ethylene glycol monobutyl ether, diethylene glycol monoethyl ether acetate, diethylene glycol dimethyl ether, diethylene glycol methylethyl ether, propylene glycol monomethyl ether acetate, methyl 3-methoxypropionate, and gamma-butyrolactone.

(26) The method for manufacturing an inkjet ink according to items (23) or (24) above, wherein the compound having two or more acid anhydride groups (a1) is at least one selected from the group of 3,3',4,4'-diphenyl ether tetracarboxylic dianhydride and a styrene-maleic anhydride copolymer, the diamine (a2) is at least one selected from the group of 3,3'-diaminodiphenylsulfone and compounds expressed by the following Formula (3):

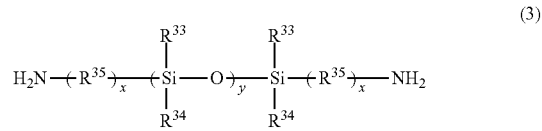

wherein $R^{33}$ and $R^{34}$ are each independently a $C_1$ to $C_3$ alkyl or phenyl, each $R^{35}$ is independently a methylene, phenylene, or alkyl-substituted phenylene, each x is independently an integer from 1 to 6, and y is an integer from 1 to 15), the monoamine (a3) is at least one selected from the group of 3-aminopropyltrimethoxysilane, 3-aminopropyltriethoxysilane, 3-aminopropylmethyldimethoxysilane, and 3-aminopropylmethyldiethoxysilane, the compound having one acid anhydride group (a4) is at least one selected from the group of trimethoxysilylpropylsuccinic anhydride and triethoxysilylpropylsuccinic anhydride, and the solvent (B) is at least one selected from the group of ethylene glycol monobutyl ether, diethylene glycol dimethyl ether, diethylene glycol methylethyl ether, and gamma-butyrolactone.

(27) The method for manufacturing an inkjet ink according to any of items (23) to (26) above, wherein the solvent (B) does not include greater or equal to approximately 20 wt % amide-based solvent with respect to the total solvent weight.

(28) The method for manufacturing an inkjet ink according to any of items (23) to (26) above, wherein the solvent (B) includes no amide-based solvent.

(29) The method for manufacturing an inkjet ink according to any of items (13) to (28) above, including approximately 5 to approximately 60 weight parts of the polyamic acid (A) per 100 weight parts inkjet ink.

(30) The method for manufacturing an inkjet ink according to any of items (13) to (29) above, wherein the inkjet ink further includes an epoxy resin (C).

(31) The method for manufacturing an inkjet ink according to item (30) above, wherein the epoxy resin (C) is at least one compound selected from the group of N,N,N',N'-tetraglycidyl-m-xylenediamine, 1,3-bis(N,N -diglycidylaminomethyl)cyclohexane, N,N,N',N'-tetraglycidyl-4,4'-diaminodiphenylmethane, and compounds expressed by the following Formulas (4) to (7):

(33) The method for manufacturing an inkjet ink according to any of items (13) to (31) above, including approximately 20 to approximately 50 weight parts of the polyamic acid (A) per 100 weight parts inkjet ink.

The water content of the inkjet ink is preferably approximately 10,000 ppm or less, and more preferably approximately 5,000 ppm or less.

(34) An inkjet ink manufactured using the method for manufacturing an inkjet ink according to any of items (13) to (33) above.

(35) A polyimide film or a patterned polyimide film, obtained via the steps of forming a polyamic acid film by applying the inkjet ink according to any of items (1) to (12) and (34) above by an inkjet coating method; and forming a polyimide film by heat treating the polyamic acid film.

(36) An ink coating method, including the steps of forming a polyamic acid film by applying the inkjet ink according to any of items (1) to (12) and (34) above by an inkjet coating method, and then drying; and forming a polyimide film by heat treating the polyamic acid film.

(37) A polyimide film forming method, wherein a polyimide film is formed using the ink coating method according to item (36) above.

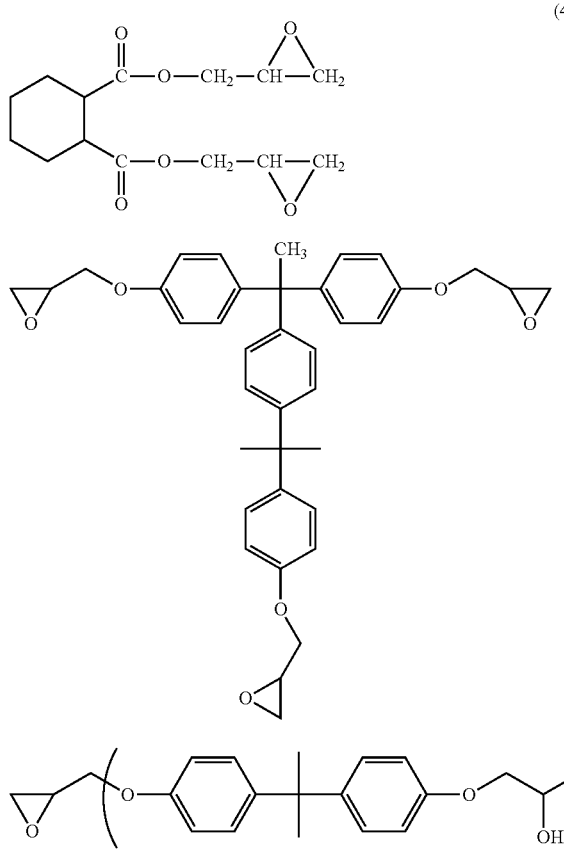

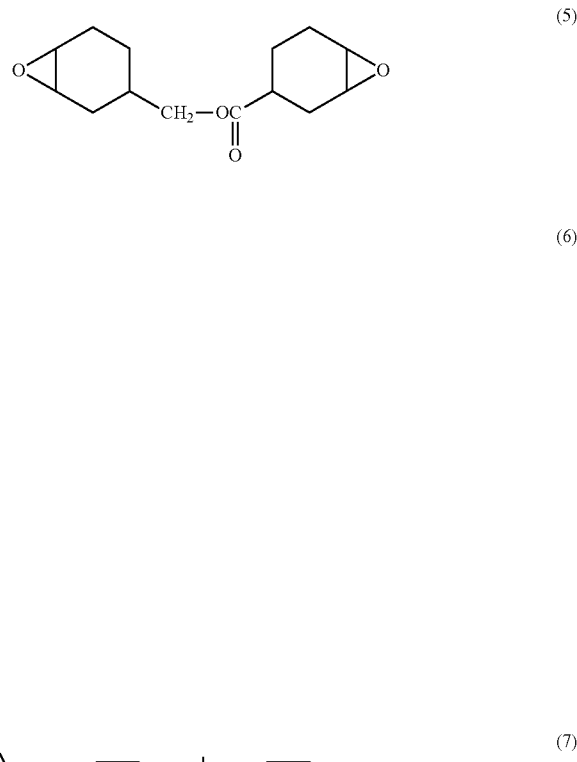

wherein n is an integer from 0 to 10.

(32) The method for manufacturing an inkjet ink according to any of items (13) to (31) above, including approximately 5 to approximately 55 weight parts of the polyamic acid (A) per 100 weight parts inkjet ink.

(38) A film substrate on which a polyimide film is formed on a substrate by the polyimide film formation method according to item (37) above.

(39) An electronic component having the film substrate according to item (38) above.

$R^1$ in Formula (1) above is a tetravalent $C_2$ to $C_{100}$ organic group; $R^2$ in Formula (1) above and $R^4$ in Formula (22) above are each independently a divalent $C_2$ to $C_{100}$ organic group;

$R^3$ in Formula (21) above and $R^{92}$ in Formula (23) above are each independently a monovalent $C_2$ to $C_{100}$ organic group; there are no other particular restrictions. There are no particular restrictions on $R^{91}$ in Formula (23) above other than that it be a $C_2$ to $C_{100}$ organic group that contains silicon.

As used herein, there are no particular restrictions on the "organic group," but examples include $C_2$ to $C_{100}$ hydrocarbons.

Specific examples of monovalent organic groups include $C_2$ to $C_{20}$ alkoxy groups that may have a substituent, $C_6$ to $C_{20}$ aryloxy groups that may have a substituent, amino groups that may have a substituent, silyl groups that may have a substituent, alkylthio groups that may have a substituent ($-SY^1$, where $Y^1$ is a $C_2$ to $C_{20}$ alkyl group that may have a substituent), arylthio groups that may have a substituent ($-SY^2$, where $Y^2$ is a $C_6$ to $C_{18}$ aryl group that may have a substituent), alkylsulfonyl groups that may have a substituent ($-SO_2Y^3$, where $Y^3$ is a $C_2$ to $C_{20}$ alkyl group that may have a substituent), arylsulfonyl groups that may have a substituent ($-SO_2Y^4$, where $Y^4$ is a $C_6$ to $C_{18}$ aryl group that may have a substituent).

As used herein, the hydrocarbon of a "$C_2$ to $C_{20}$ hydrocarbon" may be a saturated or unsaturated acyclic hydrocarbon, or may be a saturated or unsaturated cyclic hydrocarbon. If the $C_2$ to $C_{20}$ hydrocarbon is acyclic, it may be either straight-chain or branched. "$C_2$ to $C_{20}$ hydrocarbons" include $C_2$ to $C_{20}$ alkyls, $C_2$ to $C_{20}$ alkenyls, $C_2$ to $C_{20}$ alkynyls, $C_4$ to $C_{20}$ alkyldienyl, $C_6$ to $C_{18}$ aryls, $C_7$ to $C_{20}$ alkylaryls, $C_7$ to $C_{20}$ arylalkyls, $C_4$ to $C_{20}$ cycloalkyls, $C_4$ to $C_{20}$ cycloalkenyls, and so forth.

As used herein, a "$C_2$ to $C_{20}$ alkyl" is preferably a $C_2$ to $C_{10}$ alkyl, and more preferably a $C_2$ to $C_6$ alkyl. Examples of alkyls include methyl, ethyl, propyl, isopropyl, n-butyl, s-butyl, t-butyl, pentyl, hexyl, and dodecanyl, although this list is not comprehensive.

As used herein, a "$C_2$ to $C_{20}$ alkenyl" is preferably a $C_2$ to $C_{10}$ alkenyl, and more preferably a $C_2$ to $C_6$ alkenyl. Examples of alkenyls include vinyl, allyl, propenyl, isopropenyl, 2-methyl-1-propenyl, 2-methylallyl, and 2-butenyl, although this list is not comprehensive.

As used herein, a "$C_2$ to $C_{20}$ alkynyl" is preferably a $C_2$ to $C_{10}$ alkynyl, and more preferably a $C_2$ to $C_6$ alkynyl. Examples of alkynyls include ethynyl, propynyl, and butynyl, although this list is not comprehensive.

As used herein, a "$C_4$ to $C_{20}$ alkyl dienyl" is preferably a $C_4$ to $C_{10}$ alkyl dienyl, and more preferably a $C_4$ to $C_6$ alkyl dienyl. Examples of alkyl dienyl include 1,3-butanedienyl, although this list is not comprehensive.

As used herein, a "$C_6$ to $C_{18}$ aryl" is preferably a $C_6$ to $C_{10}$ aryl. Examples of aryls include phenyl, 1-naphthyl, 2-naphthyl, indenyl, biphenylyl, anthryl, and phenanthryl, although this list is not comprehensive.

As used herein, a "$C_7$ to $C_{20}$ alkylaryl" is preferably a $C_7$ to $C_{12}$ alkylaryl. Examples of alkylaryls include o-tolyl, m-tolyl, p-tolyl, 2,3-xylyl, 2,4-xylyl, 2,5-xylyl, o-cumenyl, m-cumenyl, p-cumenyl, and mesityl, although this list is not comprehensive.

As used herein, a "$C_7$ to $C_{20}$ arylalkyl" is preferably a $C_7$ to $C_{12}$ arylalkyl. Examples of arylalkyls include benzyl, phenethyl, diphenylmethyl, triphenylmethyl, 1-naphthylmethyl, 2-naphthylmethyl, 2,2-diphenylethyl, 3-phenylpropyl, 4-phenylbutyl, and 5-phenylpentyl, although this list is not comprehensive.

As used herein, a "$C_4$ to $C_{20}$ cycloalkyl" is preferably a $C_4$ to $C_{10}$ cycloalkyl. Examples of cycloalkyls include cyclopropyl, cyclobutyl, cyclopentyl, and cyclohexyl, although this list is not comprehensive.

As used herein, a "$C_4$ to $C_{20}$ cycloalkenyl" is preferably a $C_4$ to $C_{10}$ cycloalkenyl. Examples of cycloalkenyls include cyclopropenyl, cyclobutenyl, cyclopentenyl, and cyclohexenyl, although this list is not comprehensive.

As used herein, a "$C_2$ to $C_{20}$ alkoxy" is preferably a $C_2$ to $C_{10}$ alkoxy, and more preferably a $C_2$ to $C_6$ alkoxy. Examples of alkoxys include ethoxy, propoxy, butoxy, and pentyloxy, although this list is not comprehensive.

As used herein, a "$C_6$ to $C_{20}$ aryloxy" is preferably a $C_6$ to $C_{10}$ aryloxy. Examples of aryloxys include phenyloxy, naphthyloxy, and biphenyloxy, although this list is not comprehensive.

As used herein, in the "alkylthio ($-SY^1$, where $Y^1$ is a $C_2$ to $C_{20}$ alkyl group that may have a substituent)" and the "alkylsulfonyl ($-SO_2Y^3$, where $Y^3$ is a $C_1$ to $C_{20}$ alkyl group that may have a substituent)," $Y^1$ and $Y^3$ are preferably a $C_2$ to $C_{10}$ alkyl, and more preferably a $C_2$ to $C_6$ alkyl. Examples of alkyls include methyl, ethyl, propyl, isopropyl, n-butyl, s-butyl, t-butyl, pentyl, hexyl, and dodecanyl, although this list is not comprehensive.

As used herein, in the "arylthio ($-SY^2$, where $Y^2$ is a $C_6$ to $C_{18}$ aryl group that may have a substituent)" and the "arylsulfonyl ($-SO_2Y^4$, where $Y^4$ is a $C_6$ to $C_{18}$ aryl group that may have a substituent)," $Y^2$ and $Y^4$ are preferably $C_6$ to $C_{10}$ aryls. Examples of aryls include phenyl, 1-naphthyl, 2-naphthyl, indenyl, biphenylyl, anthryl, and phenanthryl, although this list is not comprehensive.

A substituent may be introduced into the "$C_1$ to $C_{20}$ hydrocarbon," "$C_2$ to $C_{20}$ alkoxy," "$C_6$ to $C_{20}$ aryloxy," "amino," "silyl," "alkylthio," "arylthio," "alkylsulfonyl," and "arylsulfonyl." Examples of these substituents include an ester, carboxyl, amide, alkyne, trimethylsilyl, amino, phosphonyl, thio, carbonyl, nitro, sulfo, imino, halogeno, and alkoxy. The substituents in this case may be introduced at substitutable positions in a quantity of from one up to the maximum number that can be substituted, and preferably from one to four substituents are introduced. If the number of substituents is two or more, the substituents may be the same or different.

As used herein, examples of an "amino that may have a substituent" include amino, dimethylamino, methylamino, methylphenylamino, and phenylamino, although this list is not comprehensive.

As used herein, examples of a "silyl that may have a substituent" include dimethylsilyl, diethylsilyl, trimethylsilyl, triethylsilyl, trimethoxysilyl, triethoxysilyl, diphenylmethylsilyl, triphenylsilyl, triphenoxysilyl, dimethylmethoxysilyl, dimethylphenoxysilyl, and methylmethoxyphenyl, although this list is not comprehensive.

Specific examples were listed above for monovalent organic groups, but specific examples of divalent organic groups herein include the monovalent organic groups listed herein, to which the valence has been increased by one. Similarly, specific examples of tetravalent organic groups herein include the monovalent organic groups listed herein, to which the valence has been increased by three.

An inkjet ink of a preferred embodiment of the invention will be less likely to diminish the durability of an inkjet head, for example. Also, when the polyamic acid composition of an inkjet ink of a preferred embodiment of the invention is used, a relatively thick polyimide film can be formed in a single jetting.

Also, when an inkjet ink of a preferred embodiment of the invention is used to form a patterned polyimide film, far less material is used to fill in just the required portions by inkjet printing, and no photomask is used, so many different kinds of product can be mass-produced, and fewer steps are required in manufacture.

A polyimide film formed from the inkjet ink of the invention has, for example, good heat resistance and electrical insulating properties, which improves the reliability and yield of electronic components.

BRIEF DESCRIPTION OF THE DRAWINGS

The accompanying drawing, which is included to provide a further understanding of the invention and is incorporated in and constitutes a part of this specification, illustrates an embodiment of the invention and together with the description serves to explain the principles of the invention. In the drawing:

FIG. 1 is an optical micrograph of a polyimide film (21) obtained in Example 21.

DESCRIPTION OF THE PREFERRED EMBODIMENTS

The invention provides an inkjet ink including a polyamic acid (A) and a solvent (B); an ink coating method that makes use of said ink; a polyimide film formation method that makes use of said coating method; etc.

Polyamic Acid (A)

The polyamic acid (A) included in the inkjet ink of the invention can be obtained by using a step of at least reacting one or more compounds selected from the group of a monoamine (a3) and a compound having one acid anhydride group (a4) with a compound having two or more acid anhydride groups (a1) and a diamine (a2), but is not limited to a polyamic acid obtained by this manufacturing method.

The compound having two or more acid anhydride groups (a1), compound having one acid anhydride group (a4), diamine (a2), and monoamine (a3) that can be used to obtain the polyamic acid (A) will now be described.

Compound Having Two or More Acid Anhydride Groups (a1)

Specific examples of the compound having two or more acid anhydride groups (a1) used in the synthesis of the polyamic acid (A) in the invention include copolymers of a radical polymerizable monomer having an anhydride group with another radical polymerizable monomer (such as a copolymer of styrene and maleic anhydride, or a copolymer of methyl methacrylate and maleic anhydride), and tetracarboxylic dianhydrides expressed by the above-mentioned General Formula (8). Examples of tetracarboxylic dianhydrides include 2,2',3,3'-benzophenonetetracarboxylic dianhydride, 2,3,3',4'-benzophenonetetracarboxylic dianhydride, 2,2',3,3'-diphenylsulfonetetra carboxylic dianhydride, 2,3,3',4'-diphenylsulfonetetra carboxylic dianhydride, 2,2',3,3'-diphenyl ether tetracarboxylic dianhydride, 2,3,3',4'-diphenyl ether tetracarboxylic dianhydride, ethylene glycol bis (anhydrotrimellitate), ethanetetra carboxylic dianhydride, 4-(2,5-dioxotetrahydrofuran-3-yl)-1,2,3,4-tetrahydronaphthalene-1,2-dicarboxylic anhydride, 5-(2,5-dioxotetrahydrofuryl)-3-methyl-3-cyclo hexene-1,2-dicarboxylic anhydride, and compounds expressed by the following Formulas a1-1 to a1-73.

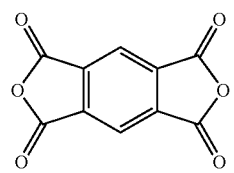

a1-1

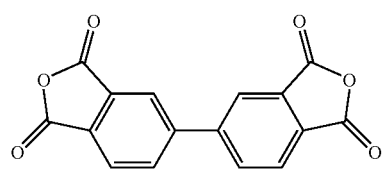

a1-2

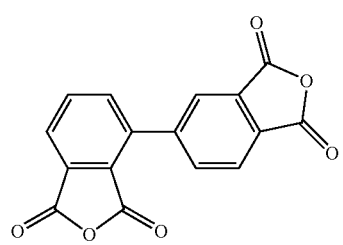

a1-3

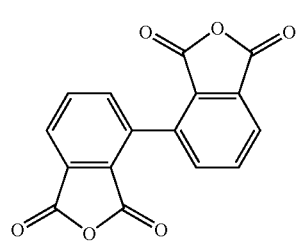

a1-4

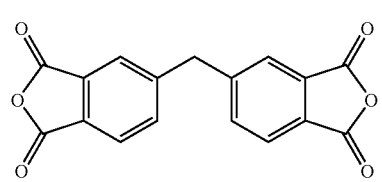

a1-5

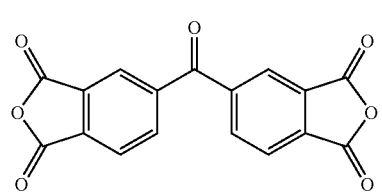

a1-6

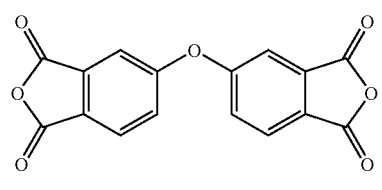

a1-7

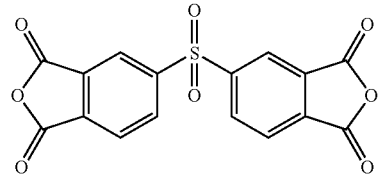

a1-8

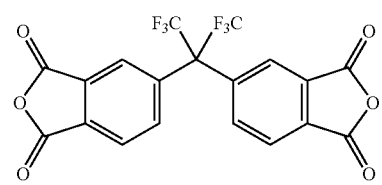
a1-9
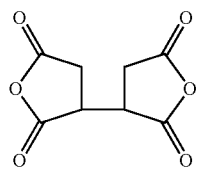
a1-18
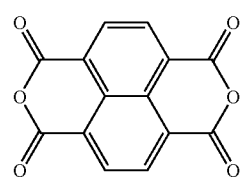
a1-10
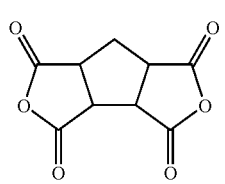
a1-19
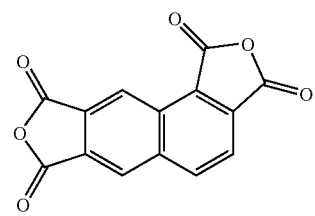
a1-11
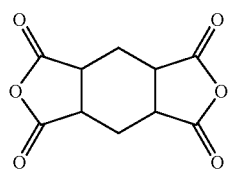
a1-20
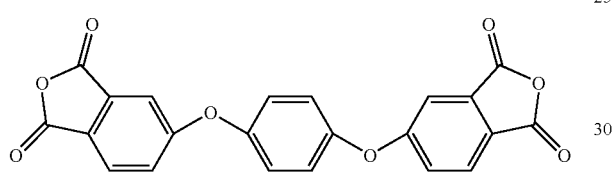
a1-12
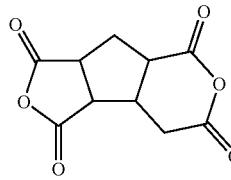
a1-21
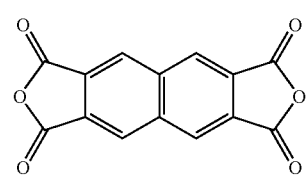
a1-13
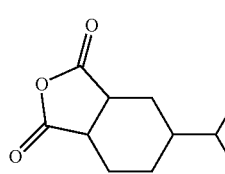
a1-22
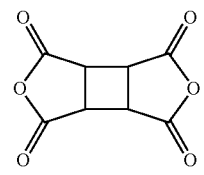
a1-14
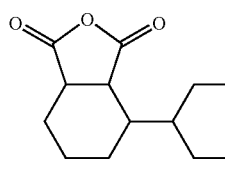
a1-23
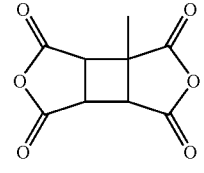
a1-15
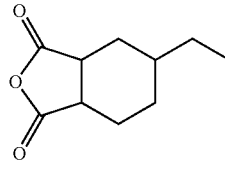
a1-24
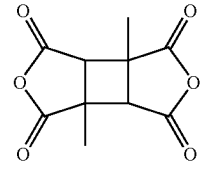
a1-16
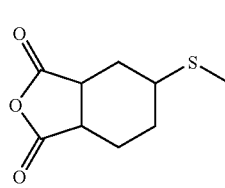
a1-25
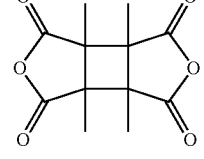
a1-17
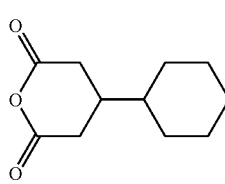
a1-26

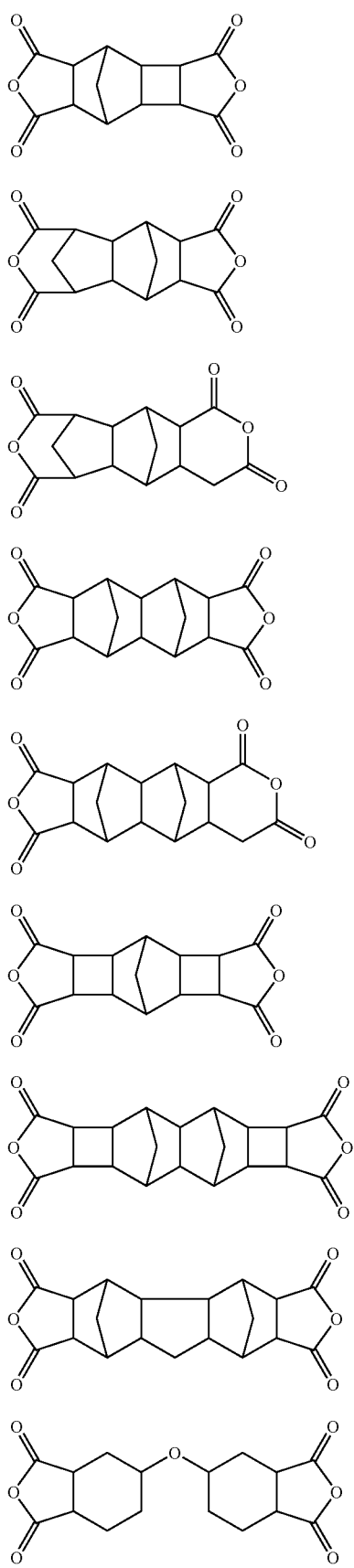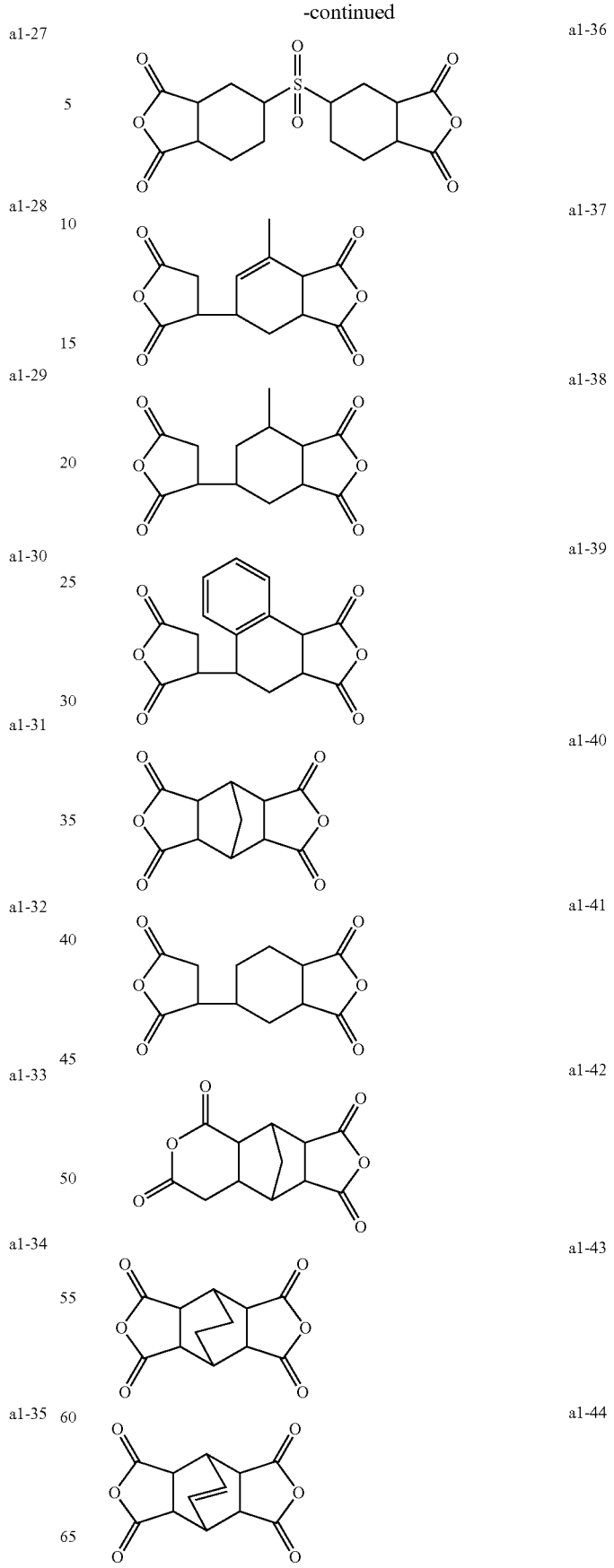

-continued
a1-45
a1-46
a1-47
a1-48
a1-49
a1-50
a1-51
a1-52
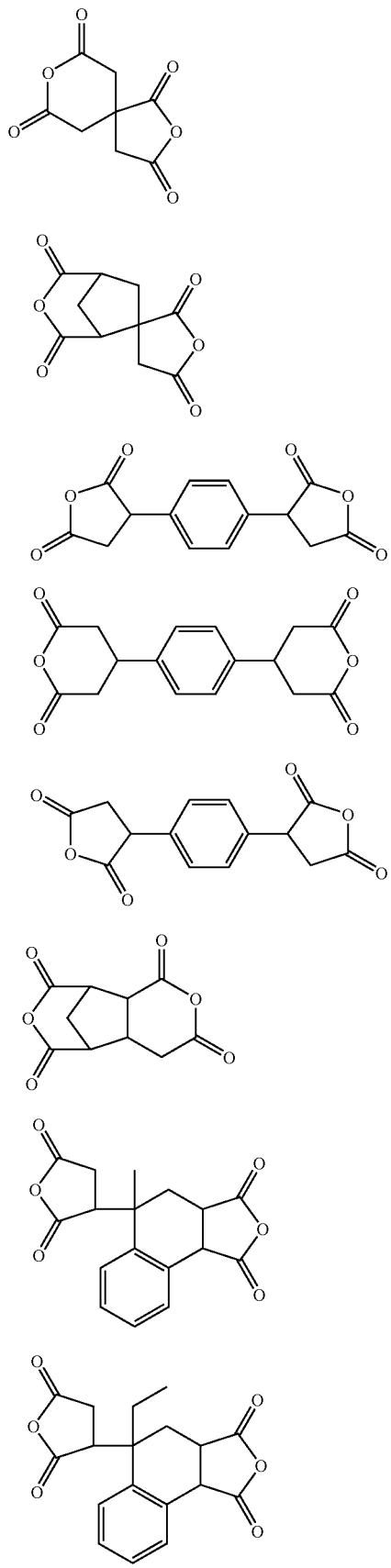
-continued
a1-53
a1-54
a1-55
a1-56
a1-57
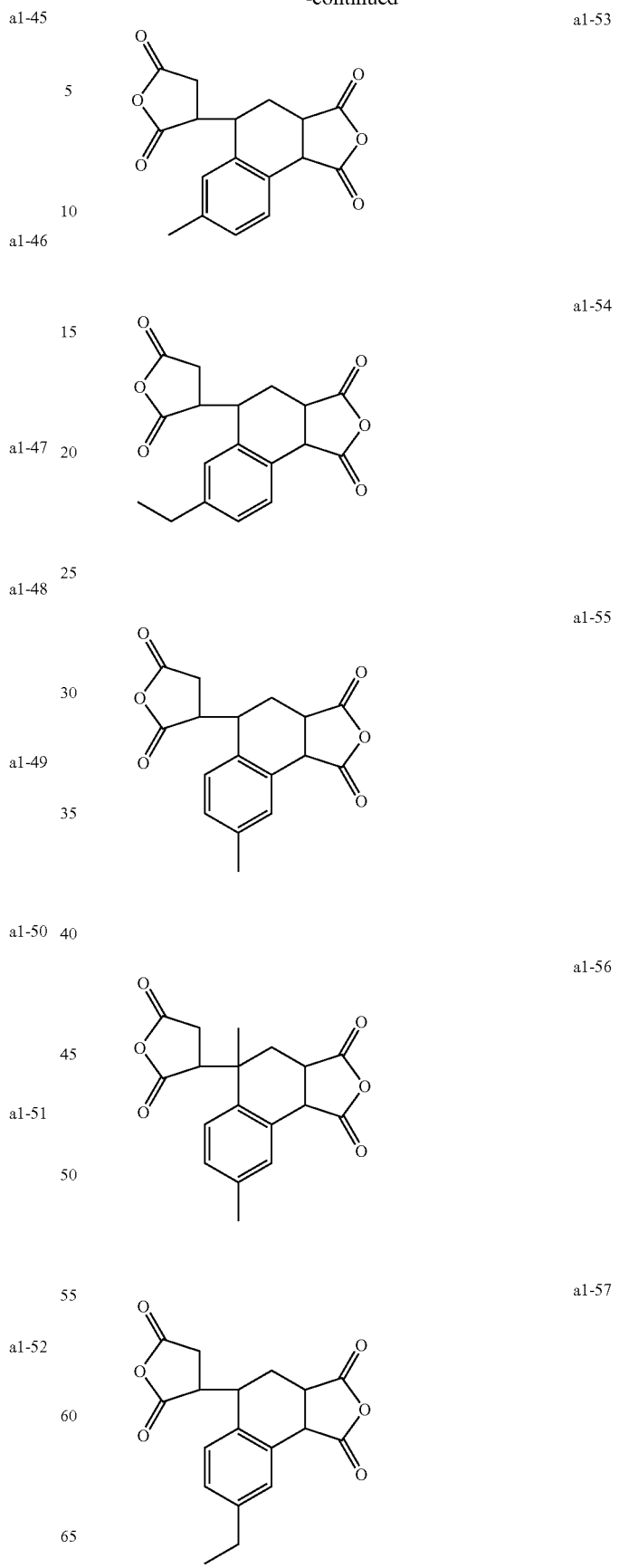

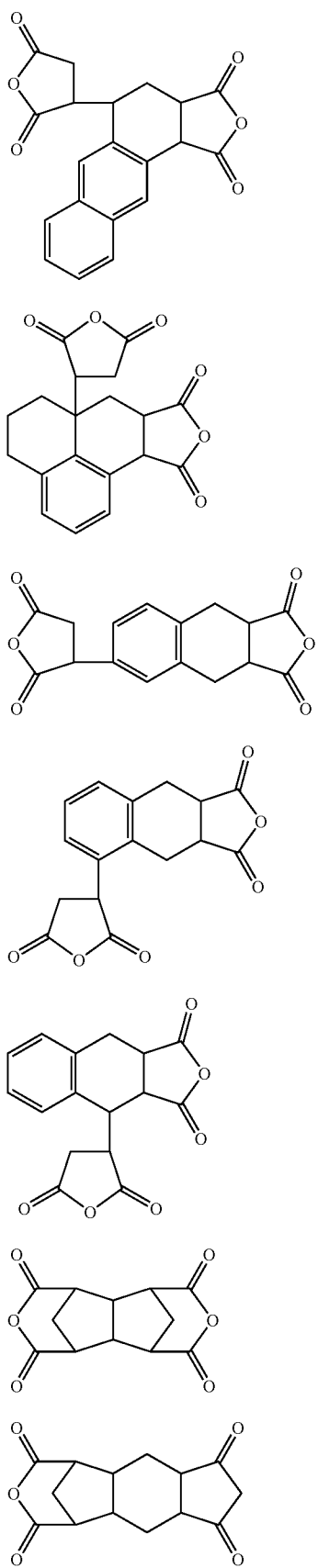
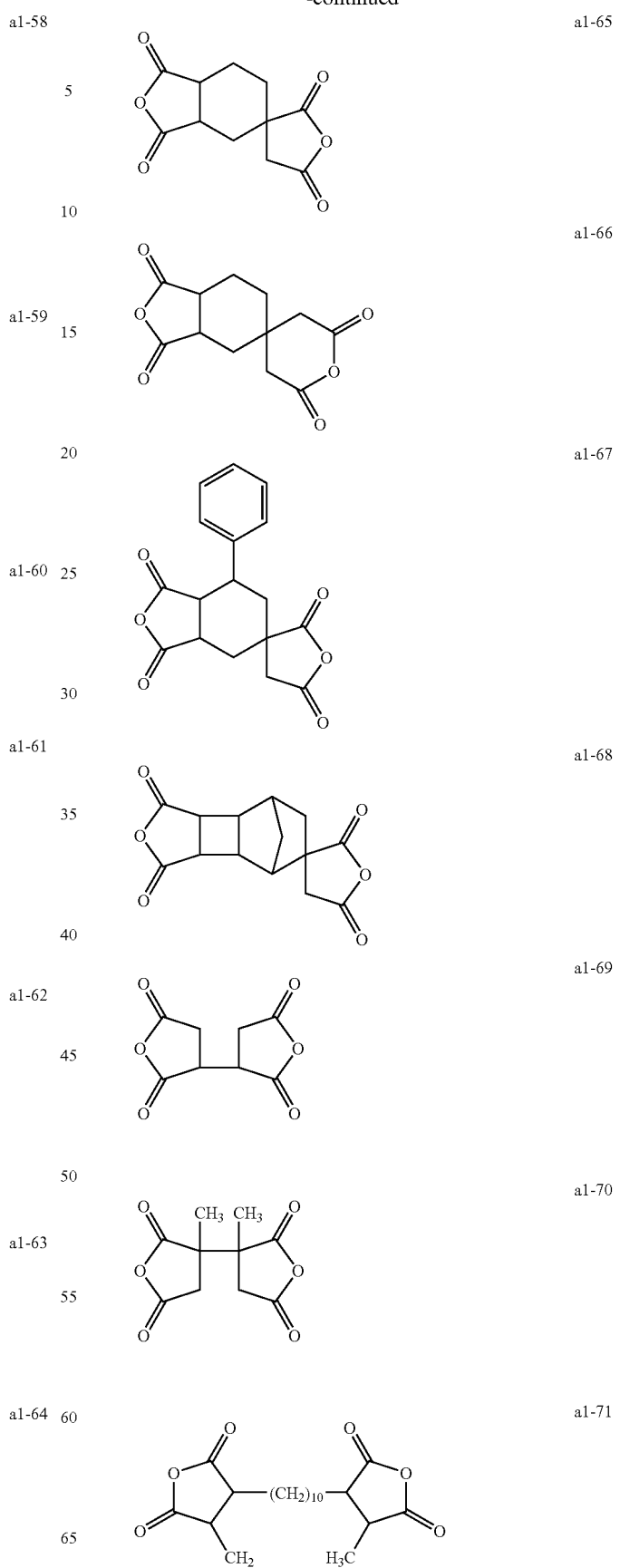

-continued a1-72

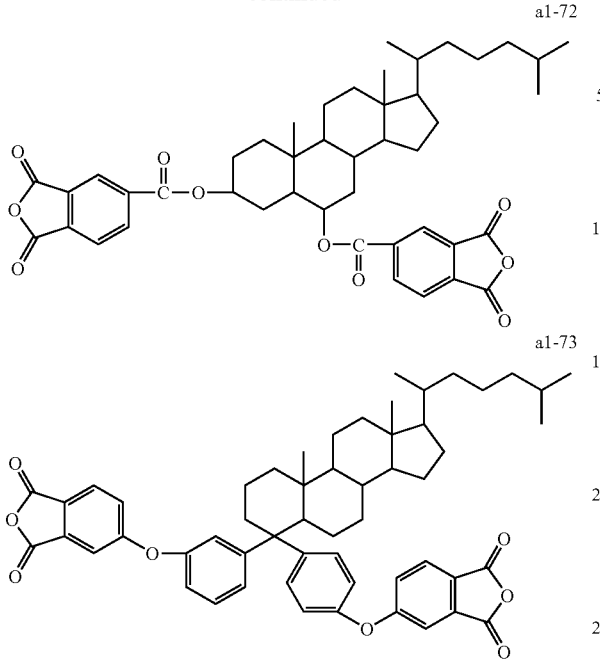

a1-73

Of the above specific examples of compounds having two or more acid anhydride groups, a styrene-maleic anhydride copolymer or a compound expressed by Formula a1-1, a1-5, a1-6, a1-7, a1-8, a1-9, a1-14, a1-18, or a1-20 is preferable because the solubility in a solvent is higher and an ink with higher concentration can be prepared. Depending on the intended application of the inkjet ink, high transparency may be necessary, in which case a styrene-maleic anhydride copolymer or a compound expressed by Formula a1-6, a1-7, a1-8, a1-9, a1-14, a1-18, etc., is particularly favorable.

The above-mentioned compounds having acid anhydride groups may be used singly, or two or more different kinds may be used in combination.

Diamine (a2)

There are no particular restrictions on the diamine (a2) used in the synthesis of the polyamic acid (A) in the invention, as long as it has two amino groups, but examples include compounds expressed by the above-mentioned General Formula (9). Specific examples of compounds expressed by General Formula (9) include compounds expressed by the following General Formulas (II) to (VIII).

$$H_2N-A^1-NH_2 \quad (II)$$

 (III)

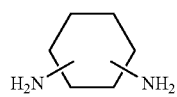 (IV)

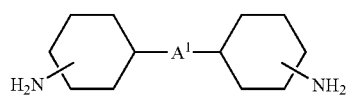 (V)

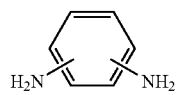

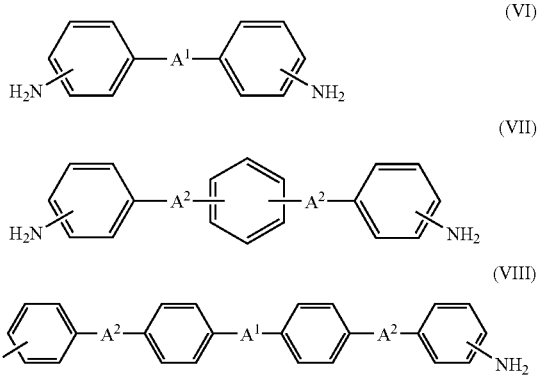 (VI)

(VII)

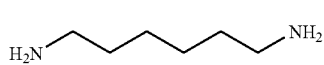

(VIII)

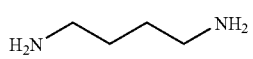

In Formula (II), $A^1$ is $-(CH_2)_m-$, where m is an integer from 1 to 6, in Formulas (III) to (VII), $A^1$ is a single bond, $-O-$, $-S-$, $-S-S-$, $-SO_2-$, $-CO-$, $-CONH-$, $-NHCO-$, $-C(CH_3)_2-$, $-C(CF_3)_2-$, $-(CH_2)_m-$, $-O-(CH_2)_m-O-$, or $-S-(CH_2)_m-S-$, where m is an integer from 1 to 6, $A^2$ is a single bond, $-O-$, $-S-$, $-CO-$, $-C(CH_3)_2-$, $-C(CF_3)_2-$, or a $C_1$ to $C_3$ alkylene, and a hydrogen bonded to a cyclohexane ring or benzene ring may be substituted with $-F$ or $-CH_3$.

Examples of diamines expressed by General Formula (II) include diamines expressed by the following Formulas II-1 to II-3.

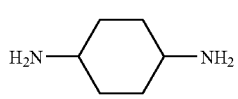 II-1

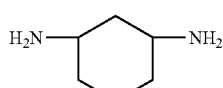 II-2

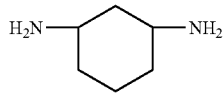 II-3

Examples of diamines expressed by General Formula (III) include diamines expressed by the following Formulas III-1 and III-2.

III-1

III-2

Examples of diamines expressed by General Formula (IV) include diamines expressed by the following Formulas IV-1 to IV-3.

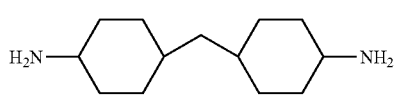 IV-1

IV-2
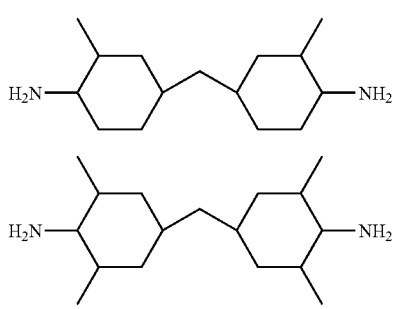
IV-3
Examples of diamines expressed by General Formula (V) include diamines expressed by the following Formulas V-1 to V-5.
V-1
V-2
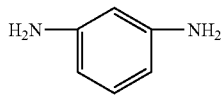
V-3
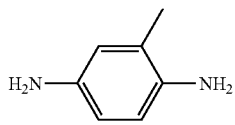
V-4
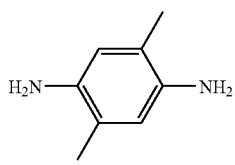
V-5
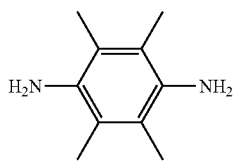
Examples of diamines expressed by General Formula (VI) include diamines expressed by the following Formulas VI-1 to VI-30.
VI-1
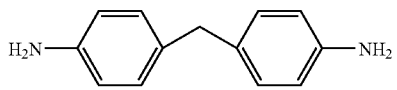
VI-2
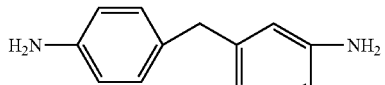
VI-3
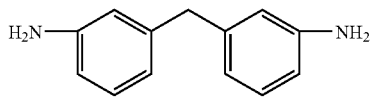
VI-4
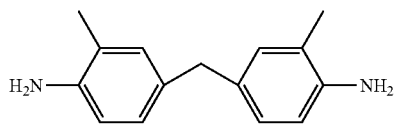
VI-5
VI-6
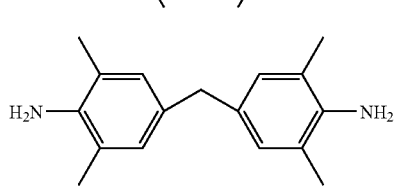
VI-7
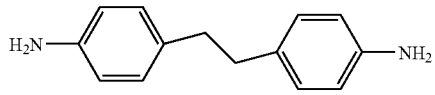
VI-8
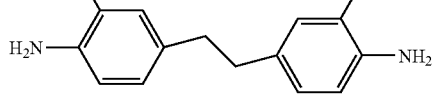
VI-9
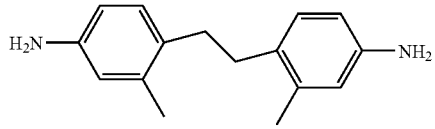
VI-10
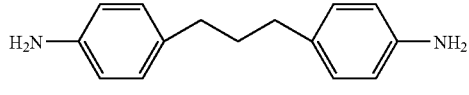
VI-11
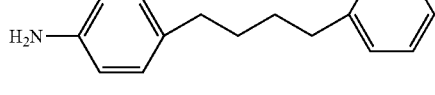
VI-12
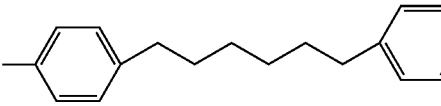
VI-13
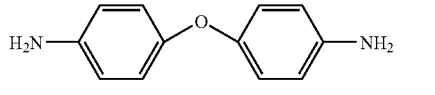
VI-14
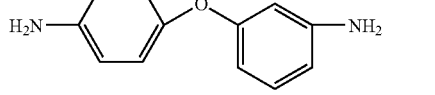
VI-15
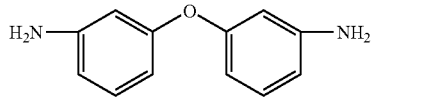
VI-16
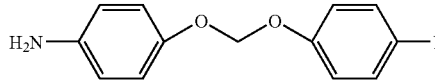

VI-17
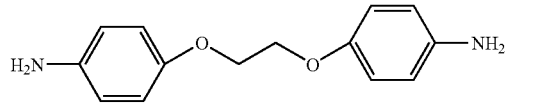
VI-18
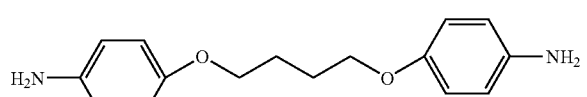
VI-19
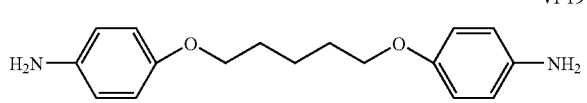
VI-20
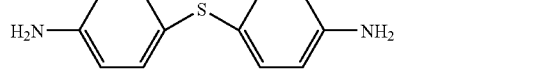
VI-21
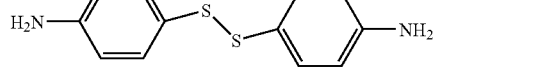
VI-22
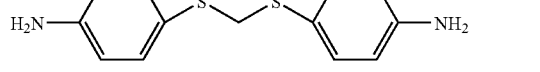
VI-23
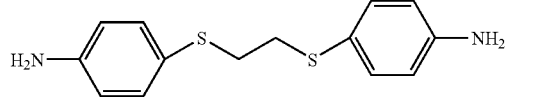
VI-24
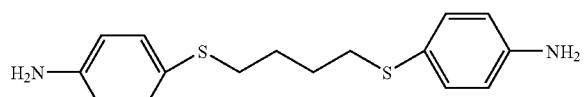
VI-25
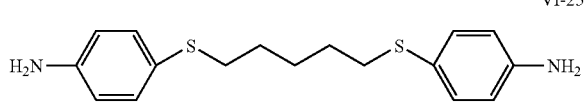
VI-26
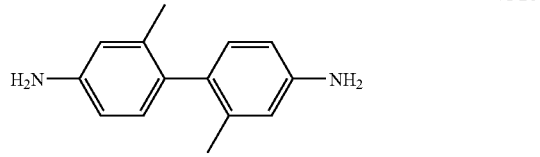
VI-27
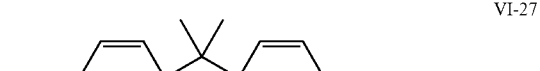
VI-28
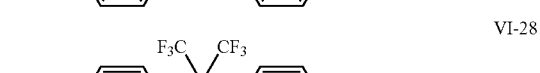
VI-29
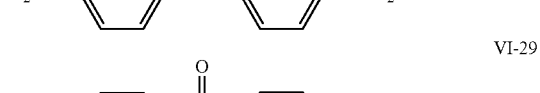
VI-30
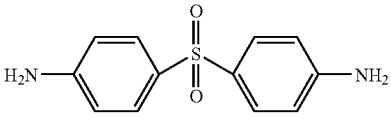
Examples of diamines expressed by General Formula (VII) include diamines expressed by the following Formulas VII-1 to VII-6.
VII-1
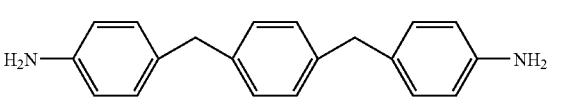
VII-2
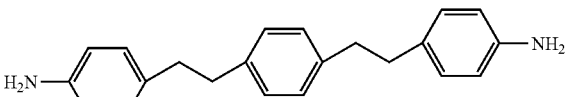
VII-3
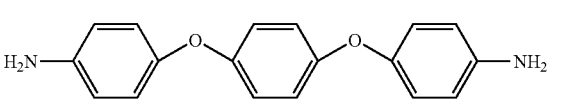
VII-4
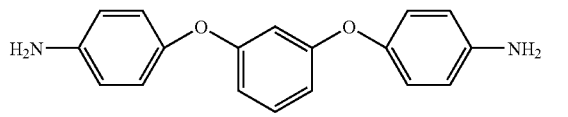
VII-5
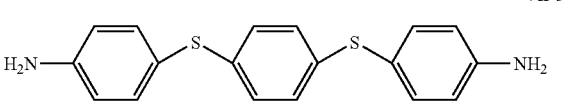
VII-6
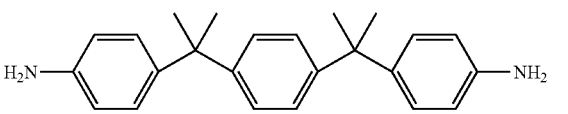
Examples of diamines expressed by General Formula (VIII) include diamines expressed by the following Formulas VIII-1 to VIII-11.
VIII-1
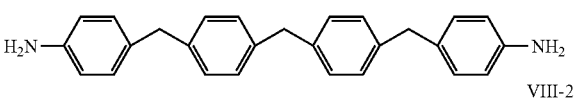
VIII-2
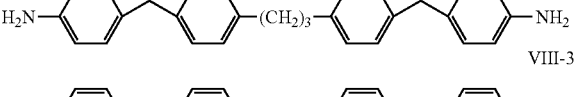
VIII-3
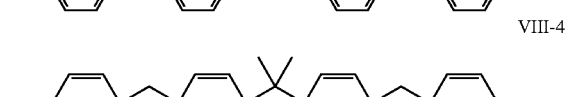
VIII-4

-continued

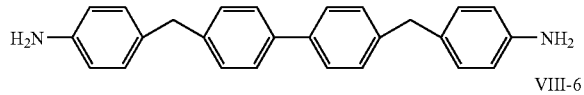
VIII-5

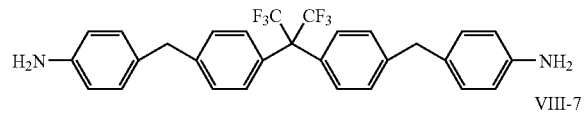
VIII-6

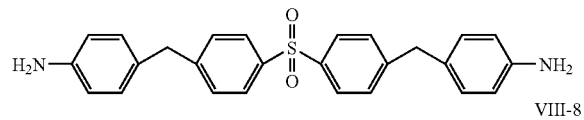
VIII-7

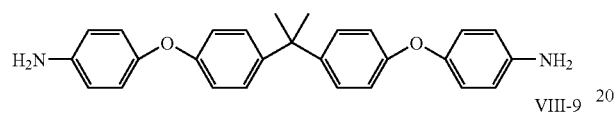
VIII-8

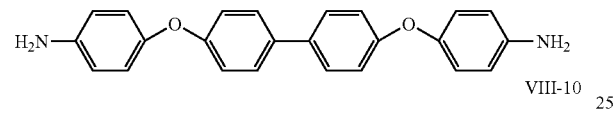
VIII-9

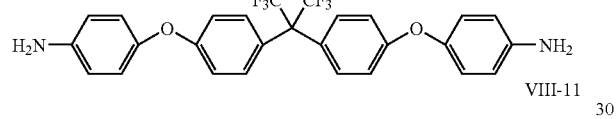
VIII-10

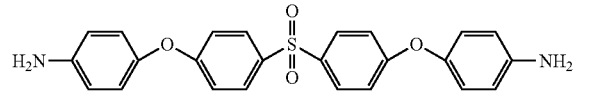
VIII-11

Of the above specific examples of the diamine (a2) expressed by General Formulas (II) to (VIII), preferable examples include diamines expressed by Formulas V-1 to V-5, Formulas VI-1 to VI-12, Formula VI-26, Formula VI-27, Formula VII-1, Formula VII-2, Formula VII-6, and Formulas VIII-1 to VIII-5, and more preferable examples include diamines expressed by Formula V-6, Formula V-7, and Formulas VI-1 to VI-12.

In the invention, examples of the diamine (a2) used in the synthesis of the polyamic acid (A) further include diamines expressed by General Formula (IX).

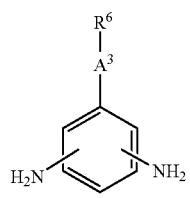
(IX)

In Formula (IX), $A^3$ is a single bond, —O—, —COO—, —OCO—, —CO—, —CONH—, or —(CH$_2$)$_m$— (where m is an integer from 1 to 6), $R^6$ is a group having a steroid skeleton, a group having a cyclohexane ring and/or a benzene ring, or, when the positional relationship of the two amino groups bonded to a benzene ring is the para position, a $C_2$ to $C_{30}$ alkyl, or when said positional relationship is meta, a $C_1$ to $C_{10}$ alkyl or phenyl; in said alkyl, any —CH$_2$— may be substituted with —CF$_2$—, —CHF—, —O—, —CH=CH—, or —C≡C—; —CH$_3$ may be substituted with —CH$_2$F, —CHF$_2$, or —CF$_3$; and a hydrogen bonded to a ring-forming carbon of said phenyl may be substituted with —F, —CH$_3$, —OCH$_3$, —OCH$_2$F, —OCHF$_2$, or —OCF$_3$.

In General Formula (IX), two amino groups are bonded to phenyl ring carbons, and preferably the bond positional relationship of the two amino groups is either the meta position or the para position. It is also preferable if the two amino groups are bonded to the 3- and 5-positions, or to the 2- and 5-positions, when the bond position of the "$R^6$-$A^3$-" is the 1-position.

Examples of the diamines expressed by General Formula (IX) include diamines by the following Formulas IX-1 to IX-11.

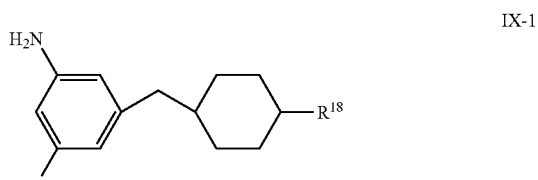
IX-1

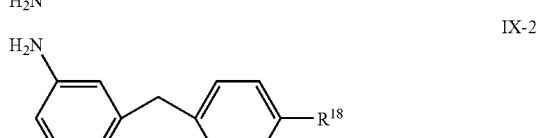
IX-2

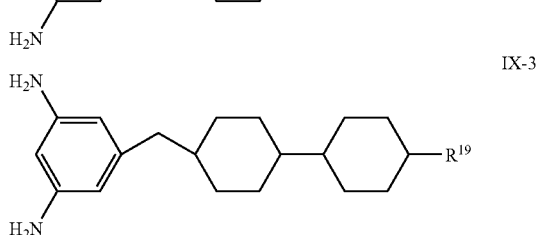
IX-3

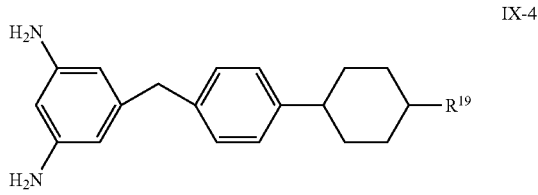
IX-4

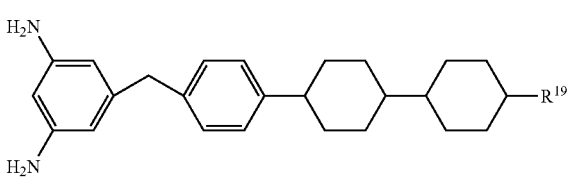
IX-5

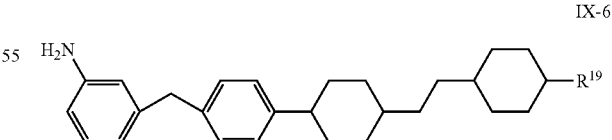
IX-6

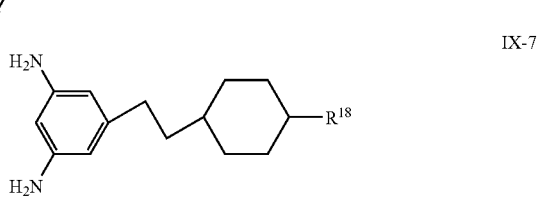
IX-7

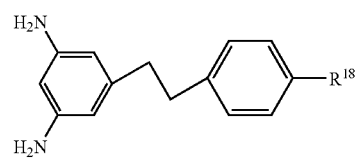

IX-8

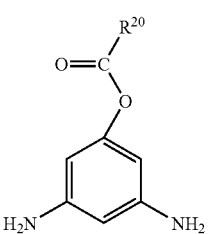

IX-14

IX-9

IX-15

IX-10

IX-16

IX-11

IX-17

In the above Formulas IX-1, IX-2, IX-7, and IX-8, $R^{18}$ is a $C_2$ to $C_{30}$ organic group, and of these, a $C_3$ to $C_{12}$ alkyl or $C_3$ to $C_{12}$ alkoxy is preferable, and a $C_5$ to $C_{12}$ alkyl or $C_5$ to $C_{12}$ alkoxy is more preferable. Also, in the above Formulas IX-3 to IX-6 and IX-9 to IX-11, $R^{19}$ is a $C_2$ to $C_{30}$ organic group, but of these, it is preferably a $C_1$ to $C_{10}$ alkyl or a $C_1$ to $C_{10}$ alkoxy, and more preferably a $C_3$ to $C_{10}$ alkyl or a $C_3$ to $C_{10}$ alkoxy.

Examples of the diamines expressed by General Formula (IX) further include the diamines expressed by the following Formulas IX-12 to IX-17.

In the above Formulas IX-12 to IX-15, $R^{20}$ is a $C_2$ to $C_{30}$ organic group, and preferably a $C_4$ to $C_6$ alkyl, and more preferably a $C_6$ to $C_{16}$ alkyl. In Formulas IX-16 and IX-17, $R^{21}$ is a $C_2$ to $C_{30}$ organic group, and preferably a $C_6$ to $C_{20}$ alkyl, and more preferably a $C_8$ to $C_{20}$ alkyl.

Examples of the diamines expressed by General Formula (IX) further include the diamines expressed by the following Formulas IX-18 to IX-38.

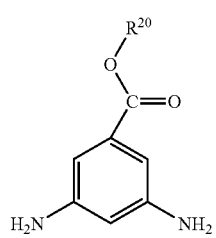

IX-12

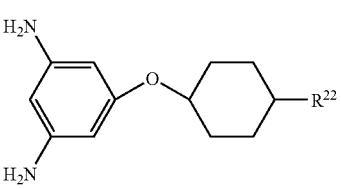

IX-18

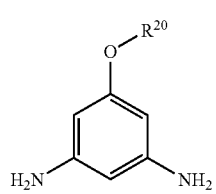

IX-13

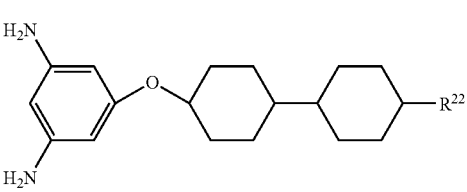

IX-19

IX-20
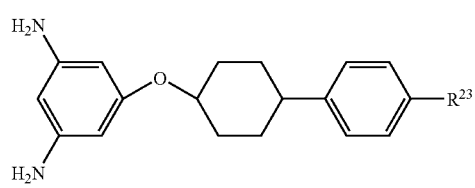
IX-21
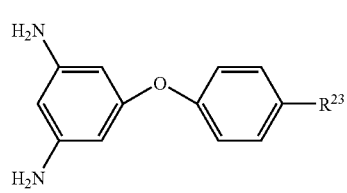
IX-22
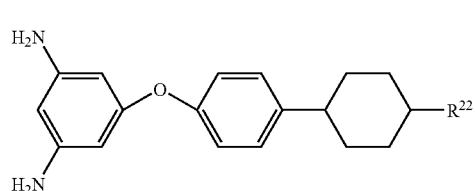
IX-23
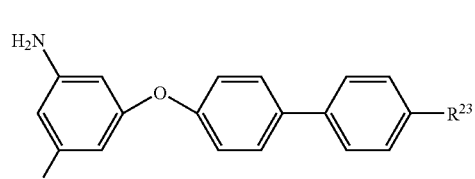
IX-24
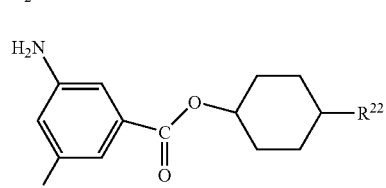
IX-25
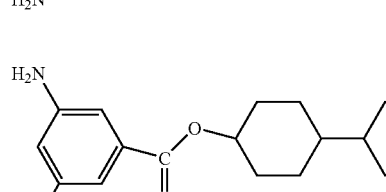
IX-26
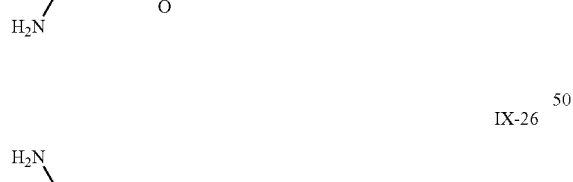
IX-27
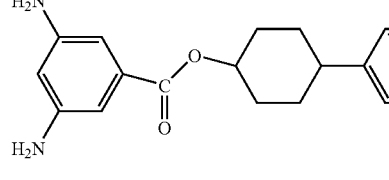
IX-28
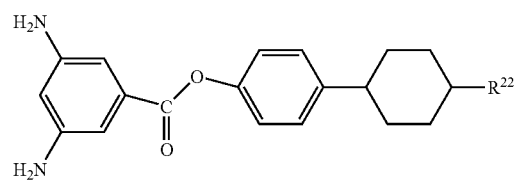
IX-29
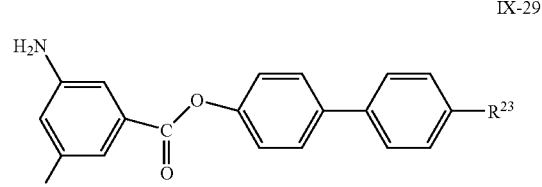
IX-30
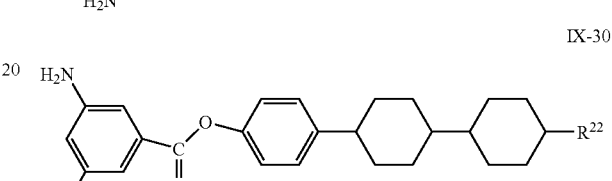
IX-31
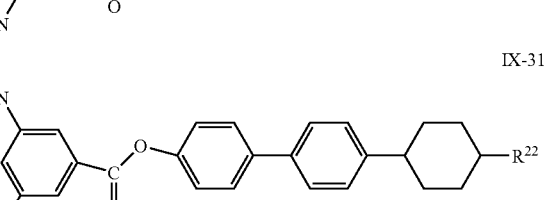
IX-32
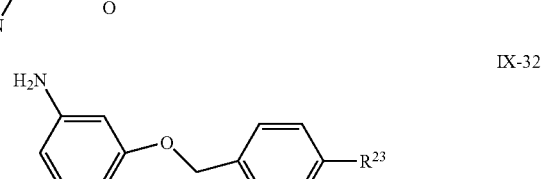
IX-33
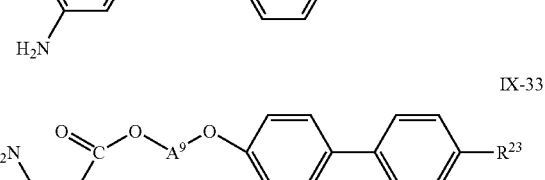
IX-34
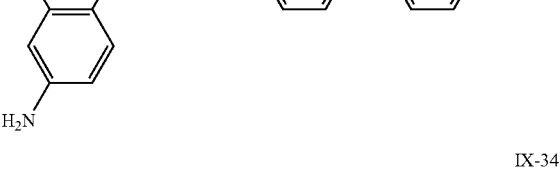
IX-35
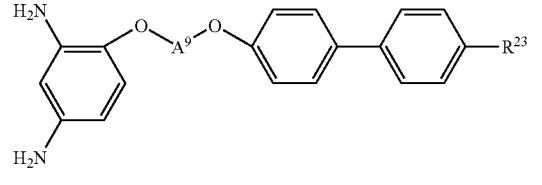

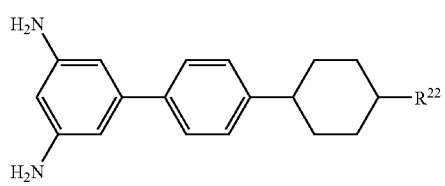
IX-36

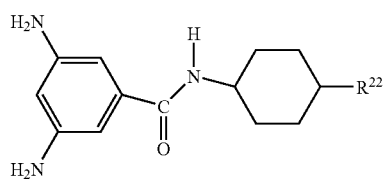
IX-37

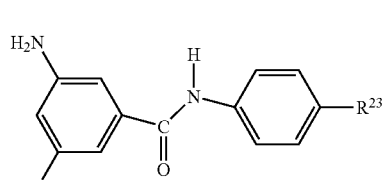
IX-38

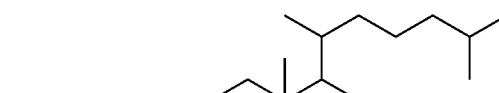
IX-40

In the above Formulas IX-18, IX-19, IX-22, IX-24, IX-25, IX-28, IX-30, IX-31, IX-36, and IX-37, $R^{22}$ is a $C_2$ to $C_{30}$ organic group, and preferably a $C_1$ to $C_{12}$ alkyl or a $C_1$ to $C_{12}$ alkoxy, and more preferably a $C_3$ to $C_{12}$ alkyl or a $C_3$ to $C_{12}$ alkoxy. In Formulas IX-20, IX-21, IX-23, IX-26, IX-27, IX-29, IX-32 to IX-35, and IX-38, $R^{23}$ is —H, —F, a $C_1$ to $C_{12}$ alkyl, a $C_1$ to $C_{12}$ alkoxy, —CN, —OCH$_2$F, —OCHF$_2$, or —OCF$_3$, and preferably a $C_3$ to $C_{12}$ alkyl or a $C_3$ to $C_{12}$ alkoxy. In Formulas IX-33 and IX-34, $A^9$ is a $C_1$ to $C_{12}$ alkylene.

Examples of the diamines expressed by General Formula (IX) further include the diamines expressed by the following Formulas IX-39 to IX-48.

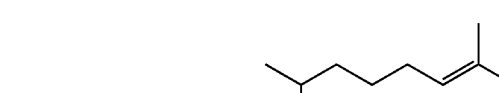
IX-41

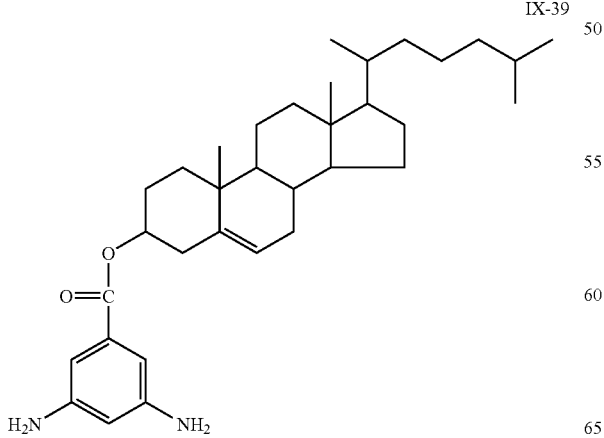

IX-43
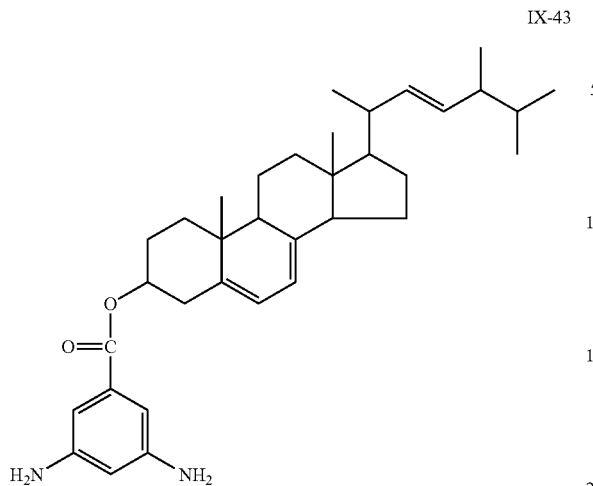

IX-44
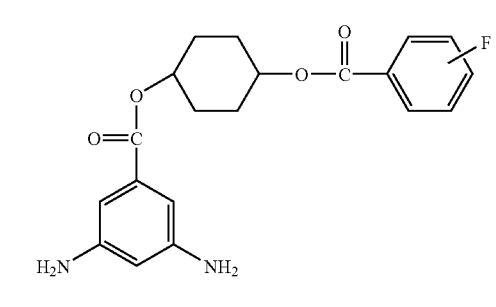

IX-45
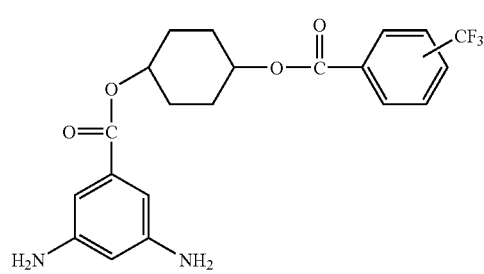

IX-46
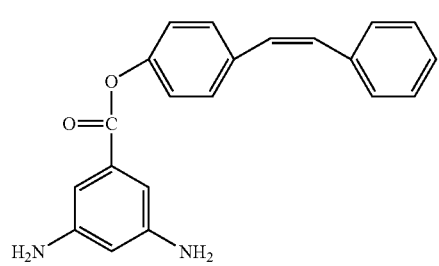

IX-47
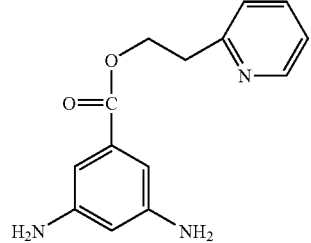

IX-48
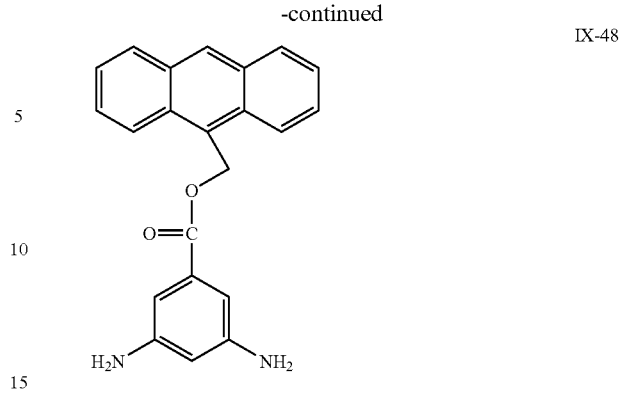

Of the diamines (a2) expressed by General Formula (IX), the diamines expressed by Formulas IX-1 to IX-11 are preferable, and the diamines expressed by Formulas IX-2, IX-4, IX-5, and IX-6 are more preferable.

In the invention, examples of the diamine (a2) used in the synthesis of the polyamic acid (A) further include compounds expressed by the following General Formulas (XI) and (XII).

(XI)
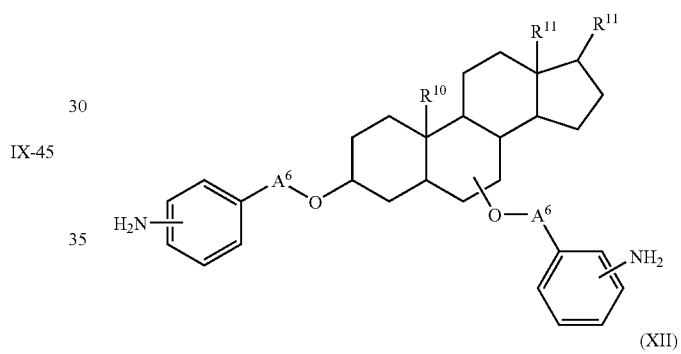

(XII)
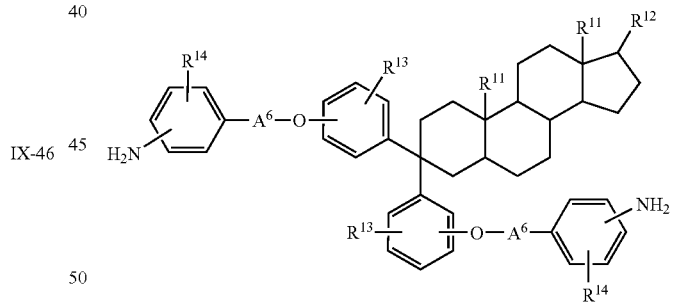

In Formulas (XI) and (XII), $R^{10}$ is —H or —$CH_3$, each $R^{11}$ is independently —H, a $C_1$ to $C_{20}$ alkyl, or a $C_2$ to $C_{20}$ alkenyl, each $A^6$ is independently a single bond, —C(=O)— or —$CH_2$—, $R^{13}$ and $R^{14}$ are each independently —H, a $C_1$ to $C_{20}$ alkyl, or a phenyl.

In the above General Formula (XI), one of the two "$NH_2$—Ph-$A^6$-O—" groups is preferably bonded to the 3-position of a steroid cores, and the other to the 6-position. Also, two amino groups are bonded to phenyl ring carbons, and preferably the bond positional relationship, with regard to $A^6$, of the two amino groups is either the meta position or the para position.

Examples of the diamines expressed by General Formula (XI) include the diamines expressed by Formulas XI-1 to XI-4.

XI-1

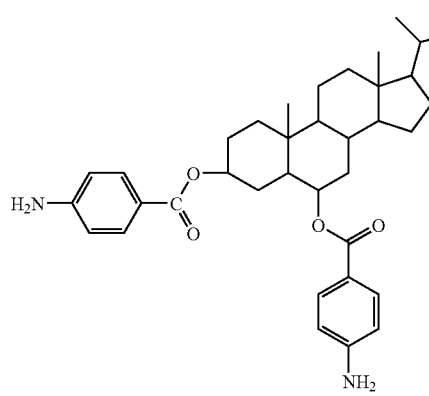

XI-3

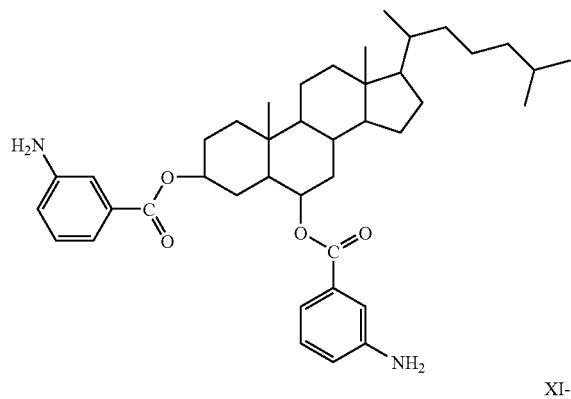

XI-2

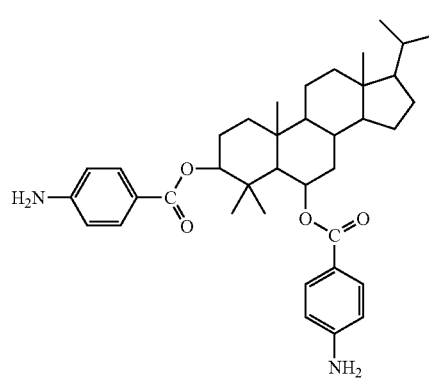

XI-4

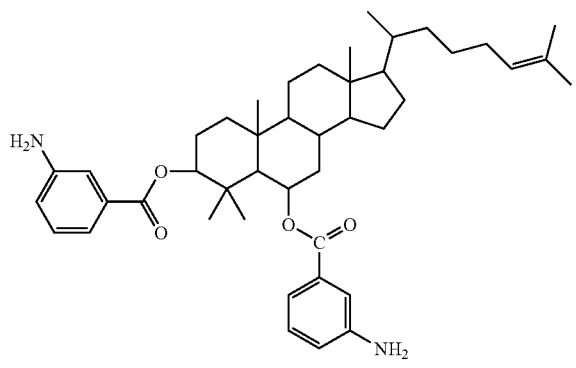

In General Formula (XII), the two "$NH_2$—($R^{14}$-)Ph-$A^6$-O—" groups are bonded to phenyl ring carbons, and preferably bonded to the meta position or the para position with respect to the carbons to which the steroid cores is bonded. Also, two amino groups are bonded to phenyl ring carbons, and preferably bonded to the meta position or the para position with respect to $A^6$.

Examples of the diamines expressed by General Formula (XII) include the diamines expressed by Formulas XII-1 to XII-8.

XII-1

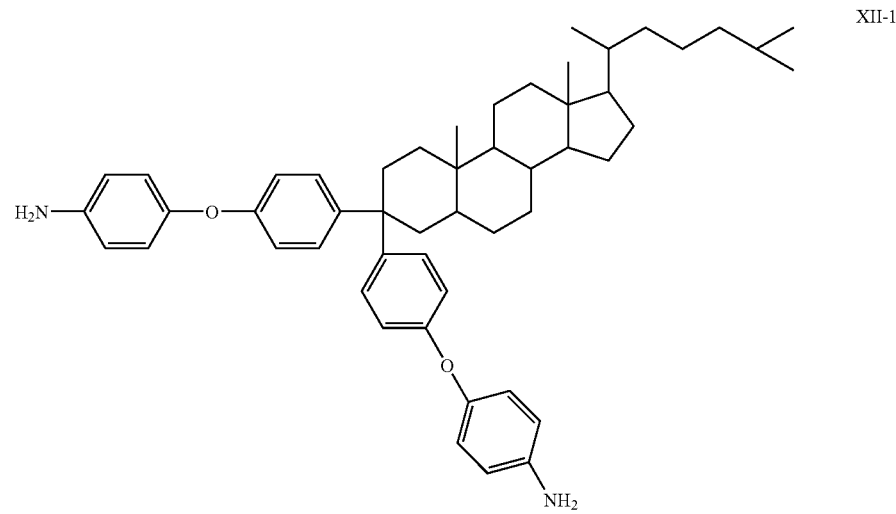

-continued
XII-2
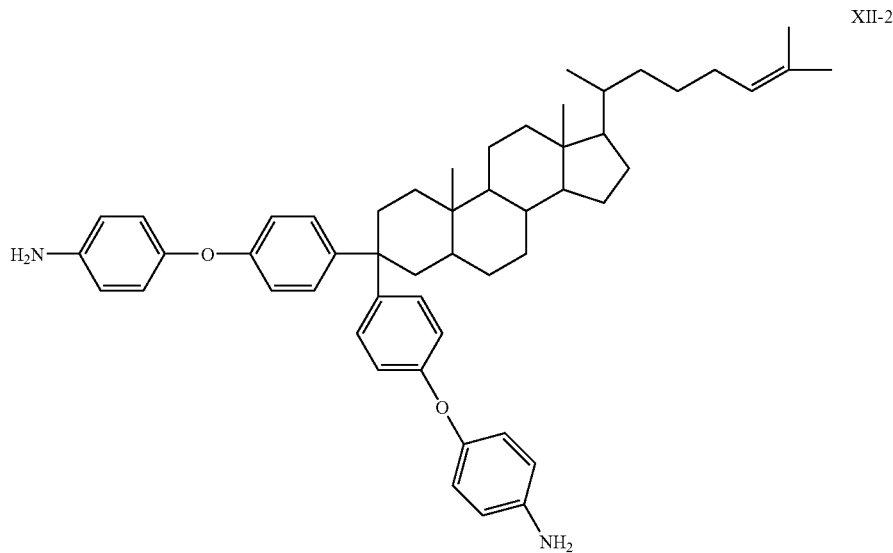
XII-3
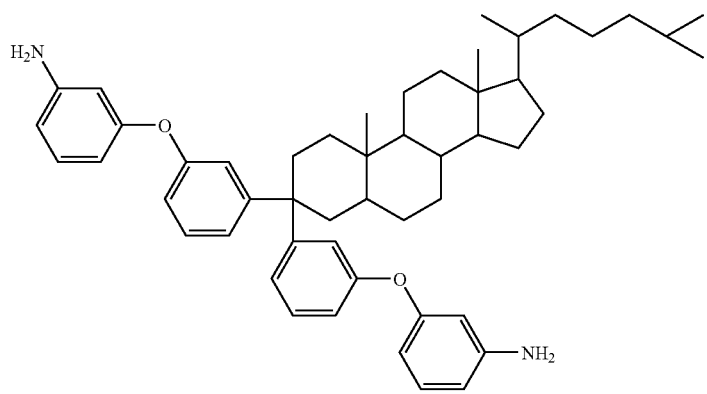
XII-4
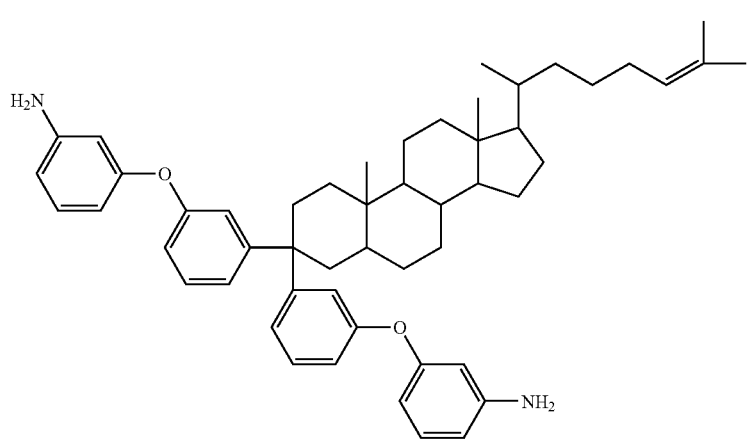

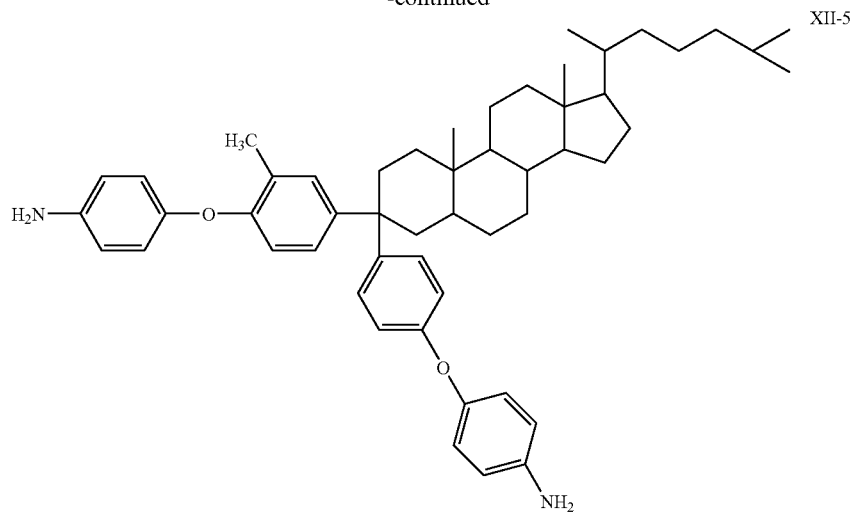
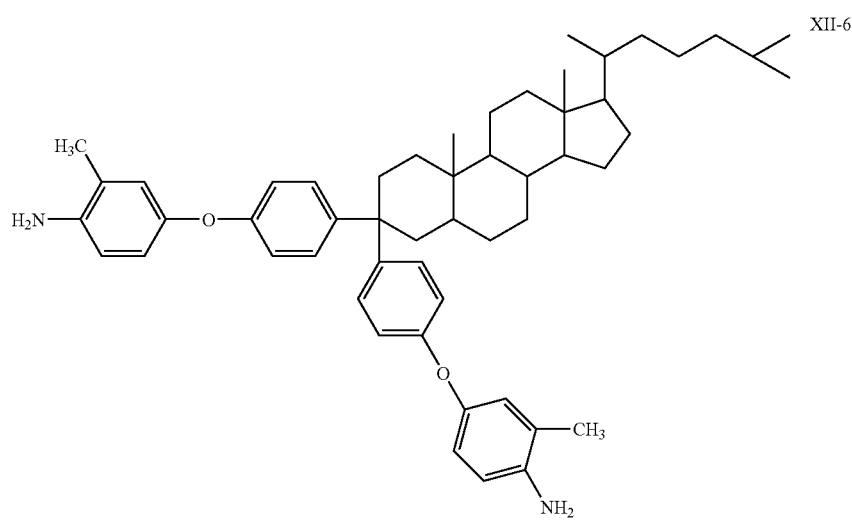
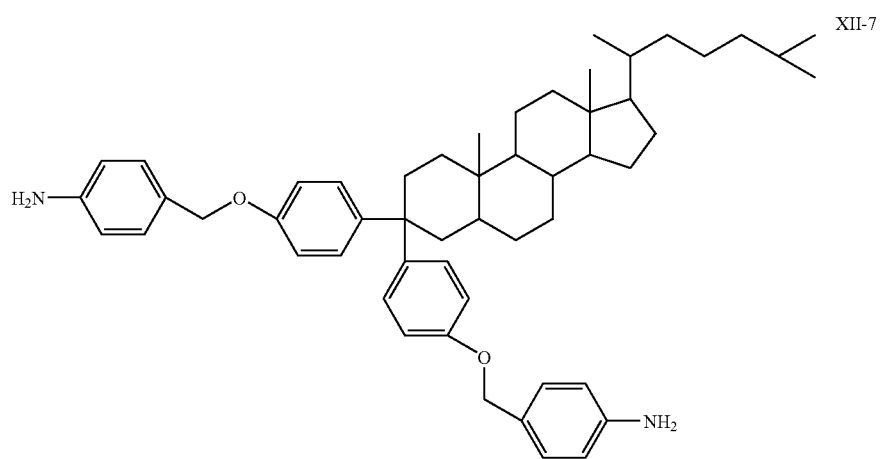

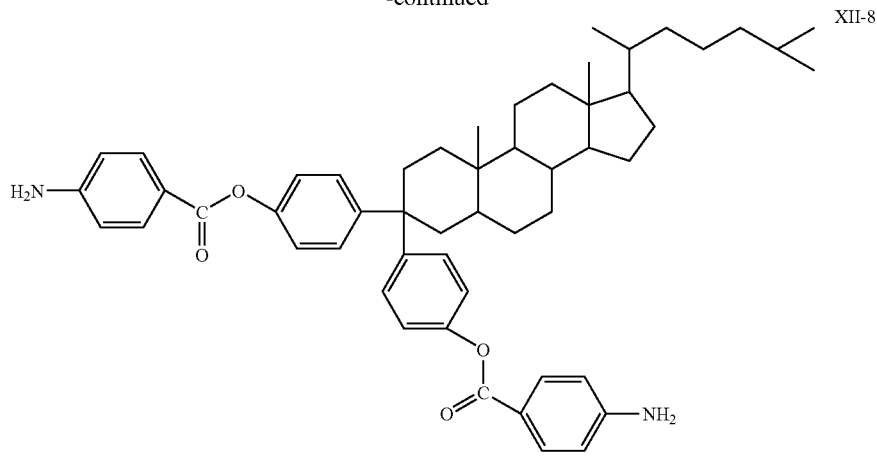

In the invention, examples of the diamine (a2) used in the synthesis of the polyamic acid (A) further include compounds expressed by General Formulas (XIII) and (XIV).

Examples of the diamines expressed by General Formula (XIII) include the diamines expressed by Formulas XIII-1 to XIII-9.

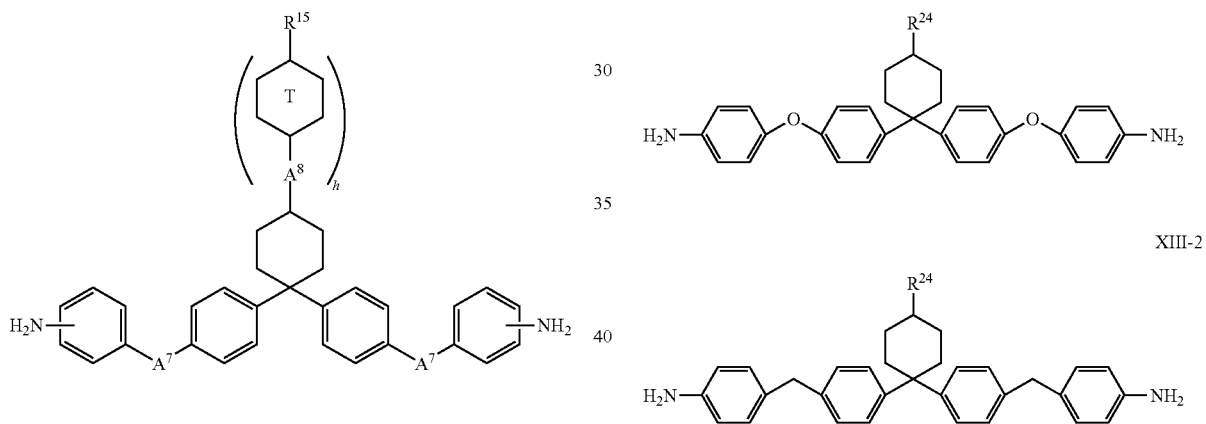

In Formula (XIII), $R^{15}$ is —H or a $C_1$ to $C_{20}$ alkyl, and among said alkyls, any —$CH_2$— of a $C_2$ to $C_{20}$ alkyl may be substituted with —O—, —CH=CH—, or —C≡C—; each $A^7$ is independently —O— or a $C_1$ to $C_6$ alkylene; $A^8$ is a single bond or a $C_1$ to $C_3$ alkylene; the ring T is 1,4-phenylene or 1,4-cyclohexylene; and h is 0 or 1.

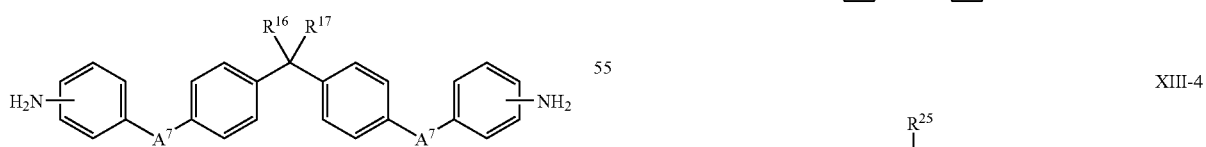

In Formula (XIV), $R^{16}$ is a $C_2$ to $C_{30}$ alkyl, and of these, a $C_6$ to $C_{20}$ alkyl is preferable. $R^{17}$ is —H or a $C_1$ to $C_{30}$ alkyl, and of these, a $C_1$ to $C_{10}$ alkyl is preferable. Each $A^7$ is independently —O— or a $C_1$ to $C_6$ alkylene.

In the above General Formula (XIII), two amino groups are bonded to phenyl ring carbons, and preferably bonded to the meta position or the para position with respect to $A^7$.

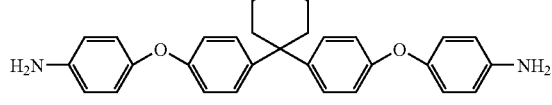

XIII-5
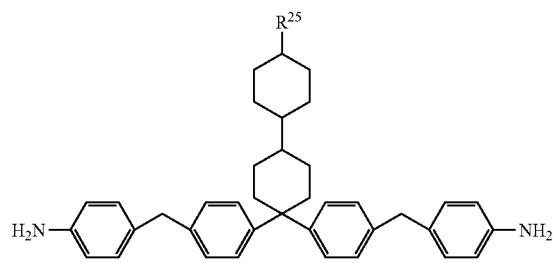

XIII-6
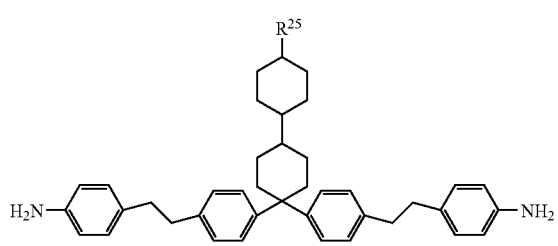

XIII-7
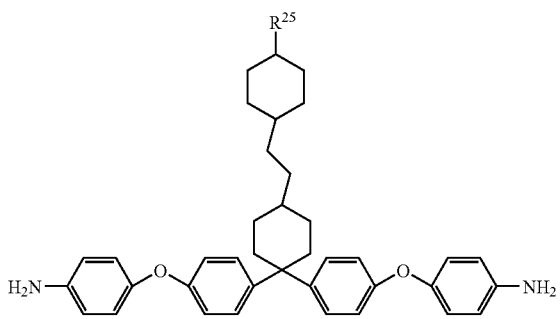

XIII-8
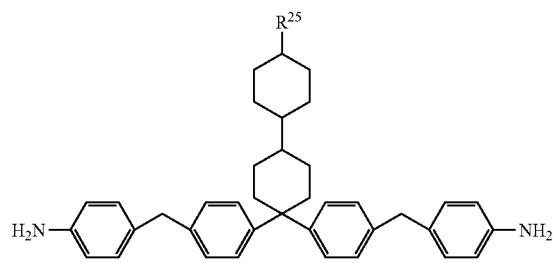

XIII-9
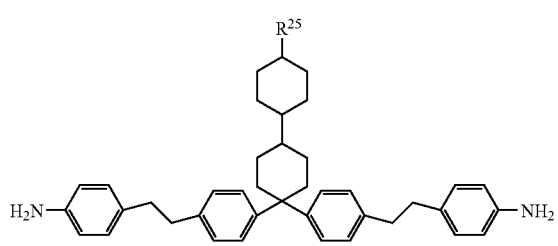

In the above Formulas XIII-1 to XIII-3, $R^{24}$ is preferably —H or a $C_1$ to $C_{20}$ alkyl group, and in XIII-4 to XIII-9, $R^{25}$ is preferably —H or a $C_1$ to $C_{10}$ alkyl group.

In the above General Formula (XIV), two amino groups are bonded to phenyl ring carbons, and preferably bonded to the meta position or the para position with respect to $A^7$.

Examples of the diamines expressed by General Formula (XIV) include the diamines expressed by Formulas XIV-1 to XIV-3.

XIV-1
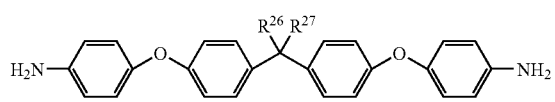

XIV-2
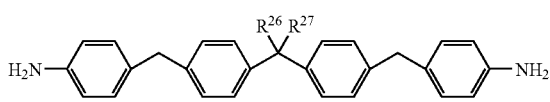

XIV-3
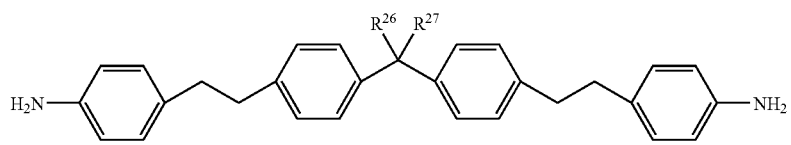

In the above Formulas XIV-1 to XIV-3, $R^{26}$ is a $C_2$ to $C_{30}$ alkyl group, and of these, a $C_6$ to $C_{20}$ alkyl group is preferable. $R^{27}$ is —H or a $C_1$ to $C_{30}$ alkyl, and of these, —H or a $C_1$ to $C_{10}$ alkyl is preferable.

As discussed above, the diamine (a2) used in the synthesis of the polyamine acid (A) in the invention can be, for example, a diamine expressed by one of the General Formulas (I) to (XIV), but diamines other than these can be used as well. For instance, a naphthalene-based diamine having a naphthalene structure, a fluorene-based diamine having a fluorene structure, a siloxane-based diamine having siloxane bond or the like can be used, either singly or as mixtures with other diamines.

There are no particular restrictions on a siloxane-based diamine, but one expressed buy the following Formula (3) can be used favorably in the invention.

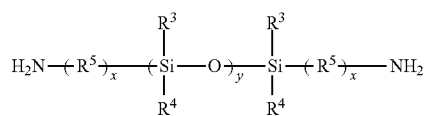
(3)

In the formula, $R^3$ and $R^4$ are each independently a $C_1$ to $C_3$ alkyl or phenyl, each $R^5$ is independently a methylene, phenylene, or alkyl-substituted phenylene, each x is independently an integar from 1 to 6, and y is an integer from 1 to 70. Preferably, y here is an integer from 1 to 15.

More preferably, the diamine (a2) used in the synthesis of the polyamic acid (A) in the invention is a diamine expressed by one of the following Formulas 11 to 18.

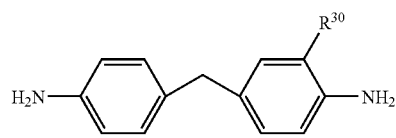
11

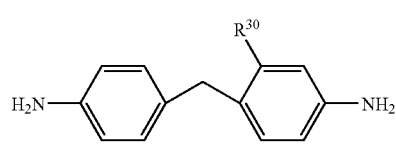
12

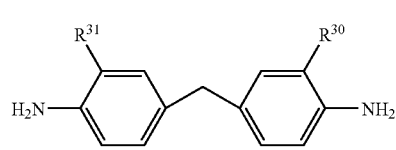
13

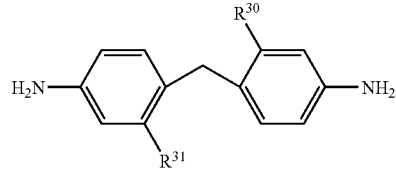
14

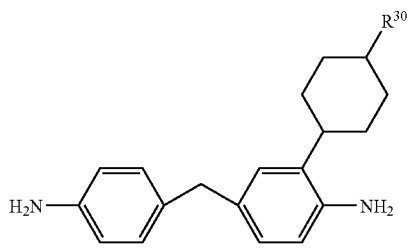
15

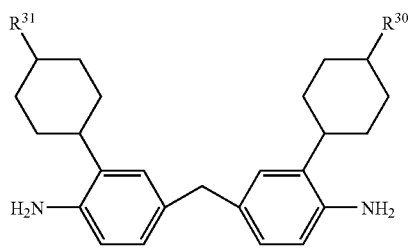
16

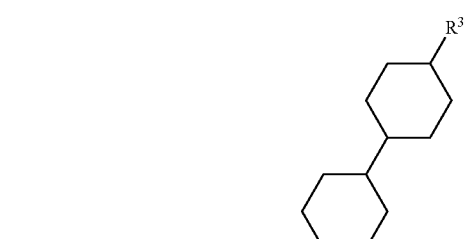
17

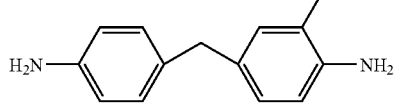

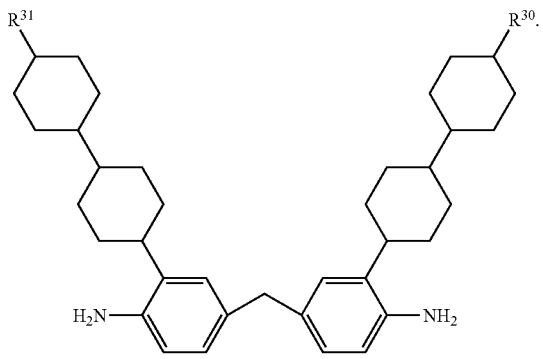
18

In the formulas, $R^{30}$ and $R^{31}$ are each independently a $C_3$ to $C_{20}$ alkyl group.

The diamines (a2) that can be used in the synthesis of the polyamic acid (A) included in the inkjet composition of the invention are not limited to the diamines listed herein, and diamines in various other forms can also be used while still achieving the object of the invention.

Also, the diamines (a2) that can be used in the synthesis of the polyamic acid (A) included in he inkjet composition of the invention can be used singly, or two or more types can be used in combination. Specifically, such a combination of two or more types can include the above-mentioned diamines, or of the above-mentioned diamines with other diamines, or of diamines other than those listed above.

Also, depending on the intended application of the inkjet ink, high transparency may be necessary, in which case it is particularly favorable to use a 3,3'-diaminodiphenylsulfone and a diamine in which y is an integer of 1 to 15 in General Formula (3).

Monoamine (a3)

There are no particular restrictions on the monoamine (a3) that can be used optionally in the synthesis of the polyamic acid (A) included in the inkjet composition of the invention, as long as it has such properties, but specific examples include 3-aminopropyltrimethoxysilane, 3-aminopropyltriethoxysilane, 3-aminopropylmethyldimethoxysilane, 3-aminopropylmethyldiethoxysilane, 4-aminobutyltrimethoxysilane, 4-aminobutyltriethoxysilane, 4-aminobutylmethyldiethoxysilane, p-aminophenyltrimethoxysilane, p-aminophenyltriethoxysilane, p-aminophenylmethyldimethoxysilane, p-aminophenylmethyldiethoxysilane, m-aminophenyltrimethoxysilane, m-aminophenylmethyldiethoxysilane, 2-aminobenzoic acid, 3-aminobenzoic acid, 4-aminobenzoic acid, monoethanolamine, n-butylamine, and aniline.

Of these, from the standpoint of obtaining a film with excellent durability, 3-aminopropyltrimethoxysilane, 3-aminopropyltriethoxysilane, p-aminophenyltrimethoxysilane, and 3-aminopropyltriethoxysilane are particularly favorable.

These monoamines can be used singly or in combinations of two or more types.

Compound Having One Acid Anhydride Group (a4)

As long as it has one acid anhydride group, there are no particular restrictions on the compound having one acid anhydride group (a4) that can be used optionally in the synthesis of the polyamic acid (A) included in the inkjet composition of the invention, but specific, preferred examples include the silicon-containing compounds expressed by the above-mentioned Formula (23). Of these silicon-containing compounds, p-(trimethoxysilyl)phenylsuccinic anhydride, p-(triethoxysilyl)phenylsuccinic anhydride, m-(trimethoxysilyl)phenylsuccinic anhydride, m-(triethoxysilyl)phenylsuccinic anhydride, trimethoxysilylpropylsuccinic anhydride, triethoxysilylpropylsuccinic anhydride, compounds expressed by the above-mentioned Formula ($\alpha$), and compounds expressed by the above-mentioned Formula ($\beta$) are preferable. Compounds expressed by the above-mentioned Formula ($\alpha$) can be obtained, for example, by reacting 5-norbornene-2,3-dicarboxylic anhydride and trimethoxysilane. Compounds expressed by the above-mentioned Formula ($\beta$) can be obtained, for example, by reacting allylnadic anhydride and trimethoxysilane.

Reaction Conditions for Synthesizing the Polyamic Acid (A)

The polyamic acid (A) can be synthesized, for example, by reacting one or more compounds selected from the group of a monoamine (a3) and a compound having one acid anhydride group (a4) with a compound having two or more acid anhydride groups (a1) and a diamine (a2).

When the monoamine (a3) is used in the synthesis of the polyamic acid (A), the diamine (a2) and the monoamine (a3) are preferably used in amounts of approximately 0.01 to approximately 0.5 mol and approximately 1 to approximately 1.98 mol, respectively, per mole of the compound having two or more acid anhydride groups (a1), and even more preferably the diamine (a2) and the monoamine (a3) are used in amounts of approximately 0.15 to approximately 0.25 mol and approximately 1.5 to approximately 1.7 mol, respectively, per mole of the compound having two or more acid anhydride groups (a1).

When the compound having one acid anhydride group (a4) is used in the synthesis of the polyamic acid (A), the compound having two or more acid anhydride groups (a1) and the compound having one acid anhydride group (a4) are preferably used in amounts of approximately 0.01 to approximately 0.5 mol and approximately 1 to approximately 1.98 mol, respectively, per mole of the diamine (a2), and even more preferably the compound having two or more acid anhydride groups (a1) and the compound having one acid anhydride group (a4) are used in amounts of approximately 0.15 to approximately 0.25 mol and approximately 1.5 to approximately 1.7 mol, respectively, per mole of the diamine (a2).

Reaction Solvent

As long as it allows the polyamic acid (A) to be synthesized, there are no particular restrictions on the solvent used to synthesize the polyamic acid (A) by reacting one or more compounds selected from the group of a monoamine (a3) and a compound having one acid anhydride group (a4) with a compound having two or more acid anhydride groups (a1) and a diamine (a2), but examples include diethylene glycol dimethyl ether, diethylene glycol diethyl ether, diethylene glycol methylethyl ether, diethylene glycol monoethyl ether acetate, ethylene glycol monoethyl ether acetate, propylene glycol monomethyl ether acetate, methyl 3-methoxypropionate, ethyl 3-ethoxypropionoate, cyclohexanone, gamma-butyrolactone, N-methyl-2-pyrrolidone, and N,N-dimethylacetamide.

Of these, propylene glycol monomethyl ether acetate, methyl 3-methoxypropionate, cyclohexanone, diethylene glycol methylethyl ether, and diethylene glycol dimethyl ether are preferable because their use results in an ink that causes less damage to the inkjet head.

These reaction solvents may be used singly or as a mixed solvent or two or more types. A mixture that includes a solvent other than the above-mentioned reaction solvents can also be used.

The reaction solvent is preferably used in an amount of at least approximately 100 weight parts per combined approximately 100 weight parts of the compound having two or more acid anhydride groups (a1), the diamine (a2), the monoamine (a3), and the compound having one acid anhydride group (a4) because the reaction will proceed more smoothly. The reaction is preferably conducted for approximately 0.2 to approximately 20 hours at approximately 0 to approximately 100° C.

Order of Addition to Reaction System

There are no particular restrictions on the order in which the reaction raw materials are added to the reaction system. Specifically, any of various methods can be employed, such as adding the compound having two or more acid anhydride groups (a1), the diamine (a2), the monoamine (a3), and the compound having one acid anhydride group (a4) all at the same time to the reaction solvent; dissolving the diamine (a2) and the monoamine (a3) in the reaction solvent and then adding the compound having two or more acid anhydride groups (a1) alone, or the compound having two or more acid anhydride groups (a1) and the compound having one acid anhydride group (a4); dissolving the compound having two or more acid anhydride groups (a1) and the compound having one acid anhydride group (a4) in the reaction solvent and then reacting the monoamine (a3) first, and then adding the diamine (a2); and reacting the compound having two or more acid anhydride groups (a1) and the diamine (a2) ahead of time to synthesize a copolymer, and then adding the monoamine (a3) to this copolymer.

Structure of Polyamic Acid (A)

The polyamic acid (A) included in the inkjet ink of the invention has, for example, structural units expressed by the above-mentioned General Formula (1), and has at least one molecular terminal group selected from the group of molecular terminal groups expressed by the above-mentioned General Formulas (21) and (22).

This polyamic acid (A) can be synthesized, for example, by reacting one or more compounds selected from the group of a monoamine (a3) and a compound having one acid anhydride group (a4) with a compound having two or more acid anhydride groups (a1) and a diamine (a2) as discussed above. Specifically, the compound of General Formula (1), which serves as the repeating units of the polyamic acid (A), can be obtained by reacting the compound having two or more acid anhydride groups (a1), which has two or more polymer groups, with the diamine (a2), which has two polymer groups. The monoamine (a3) and the compound having one acid anhydride group (a4), by contrast, have only one polymer group, so these compounds constitute molecular terminal groups in the polyamic acid (A). Specifically, $R^3$ in the above-mentioned Formula (21) is a residue of the monoamine (a3), and $R^4$ in the above-mentioned Formula (22) is a residue of the compound having one acid anhydride group (a4). This relationship between the structure of the polyamic acid (A) and the monomers is merely one example, and nor is the method for manufacturing the polyamic acid (A) limited to this method.

Weight Average Molecular Weight of Polyamic Acid (A)

The polyamic acid (A) for the inkjet ink preferably has a weight average molecular weight of approximately 1,000 to approximately 20,000 because it will then have particularly excellent solvent solubility.

In the invention, this weight average molecular weight is preferably approximately 1,000 to approximately 10,000, and more preferably approximately 1,000 to approximately 5,000, in order to further improve the solubility of the polyamic acid (A) in a solvent.

The weight average molecular weight of the polyamic acid (A) is even more preferably approximately 1,000 to approximately 4,500, and a range of approximately 1,000 to approximately 3,500 is particularly favorable.

Also, a polyamic acid (A) having a weight average molecular weight of at least approximately 1000 will not evaporate in the step of forming a polyimide film by heat treatment, and will be more chemically and mechanically stable. A polyamic acid (A) with a weight average molecular weight of approximately 20,000 or less will have better solvent solubility, so the thickness of the resulting coating film can be increased, and the composition can be used more favorably as an inkjet ink, so it is best for the weight average molecular weight of the polyamic acid (A) to be between approximately 1,000 and approximately 20,000.

The weight average molecular weight of the polyamic acid (A) can be measured by gel permeation chromatography (GPC). More specifically, it can be found by diluting the resulting polyamic acid (A) with tetrahydrofuran (THF) so that the concentration of polyamic acid is approximately 1 wt %, and measuring by gel permeation chromatography (GPC) using G4000HXL, G3000HXL, G2500HXL, and G2000HXL columns made by Tosoh, and using THF as a developer, thereby measured in terms of the polyethylene.

Solvent (B)

The inkjet ink of the invention can be obtained, for example, by dissolving the polyamic acid (A) in the solvent (B). Therefore, there are no particular restrictions on the solvent included in the inkjet ink of the invention as long as it is capable of dissolving the polyamic acid (A). Also, the solvent (B) included in the inkjet ink may be a solvent that will not dissolve the polyamic acid (A) by itself, but will dissolve it when mixed with another solvent.

Specific examples of the solvent (B) included in the inkjet ink include N-methyl-2-pyrrolidone, dimethylimidazolidinone, N-methylcaprolactam, N-methylpropionamide, N,N-dimethylacetamide, dimethyl sulfoxide, N,N-dimethylformamide, N,N-diethylfornamide, diethylacetamide, gamma-butyrolactone, ethyl lactate, 3-methyl-3-methoxybutanol, tetralin, isophorone, ethylene glycol monobutyl ether, diethylene glycol monoethyl ether, diethylene glycol monoethyl ether acetate, diethylene glycol dimethyl ether, diethylene glycol methylethyl ether, triethylene glycol monoethyl ether, propylene glycol monobutyl ether, propylene glycol monomethyl ether acetate, dipropylene glycol monomethyl ether, methyl 3-methoxypropionate, ethyl 3-ethoxypropionate, diethyl malonate, ethanol, 2-propanol, dioxane, and ethylene glycol.

Of these solvents, from the standpoint of improving the durability of an inkjet head, it is preferable for the solvent (B) to be ethyl lactate, ethylene glycol monobutyl ether, diethylene glycol monoethyl ether acetate, diethylene glycol dimethyl ether, diethylene glycol methylethyl ether, propylene glycol monomethyl ether acetate, methyl 3-methoxypropionate, or gamma -butyrolactone.

It is also preferable if the solvent (B) included in the inkjet ink of the invention does not include greater or equal to approximately 20 wt % amide-based solvent with respect to the total weight of the solvent (B), and even more preferably includes none at all. Examples of this amide -based solvent include N-methylformamide, N,N-dimethylformamide, N,N-diethylformamide, acetamide, N-methylacetamide, N,N-dimethylacetamide, diethylacetamide, N-methyl propionamide, N,N,N',N'-tetramethylurea, 2-pyrrolidone, N-methyl-2-pyrrolidone, epsilon -caprolactam, N-methylcaprolactam, and carbamic esters.

These solvents may be used alone or as mixtures of two or more types. Also, the solvent is preferably added in an amount such that the solids concentration in the inkjet ink will be between approximately 10 and approximately 50 wt %.

Epoxy Resin (C)

The inkjet ink of the invention may further include an epoxy resin (C). There are no particular restrictions on the epoxy resin (C) included in the inkjet ink of the invention as long as it has an oxirane, but a compound having two or more oxiranes is preferable.

There are no particular restrictions on the concentration of the epoxy resin (C) in the inkjet ink, but approximately 0.1 to approximately 20 wt % is preferable, and approximately 1 to approximately 10 wt % is more preferable. If the concentration is within this range, the coating film formed from the inkjet ink will have good heat resistance, chemical resistance, and flatness.

Examples of the epoxy resin (C) include bisphenol A-type epoxy resins, glycidyl ester-type epoxy resins, alicyclic epoxy resins, polymers of monomers having an oxirane, and copolymers of monomers having an oxirane with other monomers.

Specific examples of monomers having an oxirane include glycidyl(meth)acrylate, 3,4-epoxycyclohexyl(meth)acrylate, and methylglycidyl(meth)acrylate.

Specific examples of other monomers that can be copolymerized with a monomer having an oxirane include (meth) acrylic acid, methyl(meth)acrylate, ethyl(meth)acrylate, isopropyl(meth)acrylate, n-butyl(meth)acrylate, iso-butyl (meth)acrylate, tert-butyl (meth)acrylate, cyclohexyl(meth) acrylate, benzyl(meth)acrylate, 2-hydroxyethyl meth) acrylate, 2-hydroxypropyl(meth)acrylate, styrene, methylstyrene, chloromethylstyrene, (3-ethyl-3-oxetanyl) methyl(meth)acrylate, N-cyclohexylmaleimide, and N-phenylmaleimide.

Specific, preferred examples of polymers of monomers having an oxirane, and copolymers of monomers having an oxirane with other monomers, include polyglycidyl methacrylate, a copolymer of methyl methacrylate and glycidyl methacrylate, a copolymer of benzyl methacrylate and glycidyl methacrylate, a copolymer of n-butyl methacrylate and glycidyl methacrylate, a copolymer of 2-hydroxyethyl methacrylate and glycidyl methacrylate, a copolymer of (3-ethyl-3-oxetanyl)methyl methacrylate and glycidyl methacrylate, and copolymer of styrene and glycidyl methacrylate. It is preferable for the inkjet ink of the invention to include one of these epoxy resins (C) because the coating film formed from the inkjet ink will have better heat resistance.

Specific examples of the epoxy resin (C) that can be included in the inkjet ink of the invention include Epikote 807, Epikote 815, Epikote 825, Epikote 827, Epikote 828 (the compound of the above-mentioned Formula (7)), Epikote 190P, and Epikote 191P (the above are trademarks of Yuka Shell Epoxy), Epikote 1004 and Epikote 1256 (the above are trademarks of Japan Epoxy Resin), Araldite CY177 and Araldite CY184 (the compound of the above-mentioned Formula (4); the above are trademarks of Ciba-Geigy Japan), Ceroxide 2021P (the compound of the above-mentioned Formula (5)), Ceroxide 3000 and EHPE-3150 (the above are trademarks of Daicel Chemical Industries), Techmore VG3101 L (the compound of the above-mentioned Formula (6); trademark of Mitsui Chemical), N,N,N',N'-tetraglycidyl-m-xylenediamine, 1,3-bis(N,N -diglycidylaminomethyl)cyclohexane,and N,N,N',N'-tetraglycidyl-4,4'-diaminodiphenylmethane.

Of these, Araldite CY 184 (the compound of Formula (4)), Ceroxide 2021 P (the compound of Formula (5)), Techmore VG3 101L (the compound of Formula (6)), and Epikote 828 (the compound of Formula (7)) are preferred because the resulting polyimide film will have particularly good flatness.

The epoxy resin (C) may be used singly or as a mixture of two or more types.

Concentration and Water Content of Polyamic Acid (A) in the Inkjet Ink

There are no particular restrictions on the concentration of the polyamic acid (A) in the inkjet ink of the invention, but the polyamic acid (A) is preferably included in an amount of approximately 5 to approximately 60 weight parts, and more preferably 5 to 55 weight parts, and even more preferably approximately 20 to approximately 50 weight parts, per 100 weight parts inkjet ink. It is preferable for the concentration to be within this range because the film obtained from a single ink jetting will have the optimal thickness, and jetting accuracy will be higher.

There are no particular restrictions on the water content in the inkjet ink of the invention, but approximately 10,000 ppm or less is preferable, and approximately 5000 ppm or less is more preferable. It is preferable for the water content to be within this range because there will be less change in the viscosity of the inkjet ink, and storage stability will be superior.

Additives Added to the Inkjet Ink of the Invention

The inkjet ink of the invention is obtained, for example, by mixing the polyamic acid (A) and the solvent (B), but may further include the epoxy resin (C) if necessary.

Furthermore, depending on the targeted characteristics, the inkjet ink can be obtained by selecting as needed a surfactant, antistatic agent, coupling agent, epoxy curing agent (such as trimellitic acid), aminosilicon compound, solvent, pH regulator, rustproofing agent, preservative, anti-mildew agent, antioxidant, anti-reduction agent, evaporation promoter, chelating agent, water-soluble polymer, and other such additives, and adding, uniformly mixing and dissolving these.

Surfactant

A surfactant that is appropriate for the objective can be added if better coatability is desired of the inkjet ink. Specific examples of surfactants that can be added to the inkjet ink of the invention include Byk-300, Byk-306, Byk-335, Byk-310, Byk-341, Byk-344, Byk-370 (trademarks of Byk-Chemie), and other such silicon-based surfactants; Byk-354, Byk-358, Byk-361 (trademarks of Byk-Chemie), and other such acrylic-based surfactants; and DFX-18, Ftergent 250, Ftergent 251 (trademarks of Neos), and other such fluorine-based surfactants.

These surfactants may be used singly or as mixtures of two or more types.

A surfactant is used to improve wetting of an underlying substrate, leveling, and coatability, and is preferably added in an amount of approximately 0.01 to approximately 1 weight part per 100 weight parts inkjet ink.

Antistatic Agent

There are no particular restrictions on the antistatic agent added to the inkjet ink of the invention, and any known antistatic agent can be used. More specifically, examples include tin oxide, tin oxide-antimony oxide compound oxides, tin oxide-indium oxide compound oxides, and other such metal oxides, and quaternary ammonium salts.

These antistatic agents may be used singly or as mixtures of two or more types.

An antistatic agent is used to prevent electrical charging, and is preferably added in an amount of approximately 0.01 to approximately 1 weight part per 100 weight parts inkjet ink.

Coupling Agent

There are no particular restrictions on the coupling agent added to the inkjet ink of the invention, and any known coupling agent can be used. The coupling agent that is added is preferably a silane coupling agent, specific examples of which include trialkoxysilane compounds and dialkoxysilane compounds. Preferred examples include gamma-vinylpropyltrimethoxysilane, gamma-vinylpropyltriethoxysilane, gamma-acryloylpropylmethyldimethoxysilane, gamma-acryloylpropyl trimethoxysilane, gamma-acryloylpropylmethyldiethoxysilane, gamma-acryloylpropyltriethoxysilane, gamma-methacryloylpropylmethyldimethoxysilane, gamma-methacryloylpropyltrimethoxysilane, gamma-methacryloylpropylmethyldiethoxysilane, gamma-methacryloylpropyltriethoxysilane, gamma-glycidoxypropylmethyldimethoxysilane, gamma-glycidoxypropyltrimethoxysilane, gamma-glycidoxypropylmethyldiethoxysilane, gamma-glycidoxypropyltriethoxysilane, gamma-aminopropylmethyldimethoxysilane, gamma-aminopropyltrimethoxysilane, gamma-aminopropylmethyldimethoxysilane, gamma-aminopropyltriethoxysilane, N-aminoethyl-gamma-aminopropylmethyldimethoxysilane, N-aminoethyl-gamma-aminopropyltrimethoxysilane, N-aminoethyl-gamma-aminopropyldiethoxysilane, N-phenyl-gamma-aminopropyltrimethoxysilane, N-phenyl-gamma-aminopropyltriethoxysilane, N-phenyl-gamma-aminopropylmethyldimethoxysilane, N-phenyl-gamma-aminopropylmethyldiethoxysilane, gamma-mercaptopropylmethyldimethoxysilane, gamma-mercaptopropyltrimethoxysilane, gamma-mercaptopropylmethyldiethoxysilane, gamma-mercaptopropyltriethoxysilane, gammaisocyanatopropylmethyldiethoxysilane, and gamma-isocyanatopropyltriethoxysilane. Of these, gamma-vinylpropyltrimethoxysilane, gamma-acryloylpropyltrimethoxysilane, gamma-methacryloylpropyltrimethoxysilane, gamma-isocyanatopropyltriethoxysilane, and the like are preferable.

These coupling agents may be used singly or as mixtures of two or more types.

The coupling agent is preferably added in an amount of approximately 0.01 to approximately 3 weight parts per 100 weight parts inkjet ink.

Epoxy Curing Agent

There are no particular restrictions on the epoxy curing agent added to the inkjet ink of the invention, and any known epoxy curing agent can be used, but specific examples include organic acid dihydrazide compounds, imidazole and its derivatives, dicyandiamide, aromatic amines, polyvalent carboxylic acids, and polyvalent carboxylic anhydrides. More specific examples include dicyandiamides such as dicyandiamide; organic acid dihydrazides such as adipic acid dihydrazide and 1,3-bis(hydrazinocarboethyl)-5-isopropylhidantoin; imidazole derivatives such as 2,4-diamino-6-[2'-ethylimidazolyl-(1')]-ethyltriazine, 2-phenylimidazole, 2-phenyl-4-methylimidazole, and 2-phenyl-4-methyl-5-hydroxymethylimidazole; and acid anhydrides such as phthalic anhydride, trimellitic anhydride, and 1,2,4-cyclohexanetricarboxylic acid-1,2-anhydride. Above all, for transparent property trimellitic anhydride and 1,2,4-cyclohexanetricarboxylic acid-1,2-anhydride are preferred.

These epoxy curing agents may be used singly or as mixtures of two or more types.

The epoxy curing agent is preferably added in an amount of approximately 0.2 to approximately 5 weight parts per 100 weight parts inkjet ink.

Aminosilicon Compound

An aminosilicon compound can be added to the inkjet ink of the invention. Examples of aminosilicon compounds include para-aminophenyltrimethoxysilane, para-aminophenyltriethoxysilane, meta-aminophenyltrimethoxysilane, meta-aminophenyl triethoxysilane, aminopropyltrimethoxysilane, and aminopropyltriethoxysilane.

These aminosilicon compounds may be used singly or as mixtures of two or more types.

The aminosilicon compound is used to improve adhesion to a substrate, and is preferably added in an amount of approximately 0.05 to approximately 2 weight parts per 100 weight parts inkjet ink.

Other Additives

The inkjet ink of the invention can be mixed with soluble polyimides, polyesters, acrylic acid polymers, acrylate polymers, and other such polymer components to the extent that the characteristics of the invention are not compromised (and preferably within an amount of approximately 20 weight parts or less per 100 weight parts inkjet ink).

Also, polymer components, such as a polyamide that is a reaction product of a dicarboxylic acid or a derivative thereof and a diamine, or a polyamide-imide that is the reaction product of a tetracarboxylic dianhydride, a dicarboxylic acid or a derivative thereof, and a diamine can be added to the inkjet ink of the invention, to the extent that the object of the invention is not compromised.

Viscosity of the Inkjet Ink

There are no particular restrictions on the viscosity of the inkjet ink in the invention, but it is preferable for the viscosity to be from approximately 1 to approximately 50 mPa·s when jetting is performed at normal temperature (25° C.), because this improves jetting accuracy in an inkjet coating method.

The viscosity of the inkjet ink at 25° C. is more preferably from approximately 5 to approximately 30 mPa·s, and even more preferably from approximately 8 to approximately 20 mPa·s (25° C.).

When jetting is performed with the ink head heated, the viscosity of the inkjet ink at the heating temperature (preferably approximately 40 to approximately 120° C.) is preferably from approximately 1 to approximately 50 mPa·s, and more preferably from approximately 5 to approximately 30 mPa·s, with approximately 8 to approximately 20 mPa·s being particularly favorable.

Polyimide Film

A substrate surface is coated by inkjetting with the inkjet ink of the invention, and this product is heat treated with a hot plate, an oven, or the like, thereby forming a polyimide film over the entire surface or in a specific pattern (such as lines). The formation of the polyimide film of the invention is not limited to being accomplished by heat treatment, and may instead involve UV treatment or treatment with an ion beam, electron beam, gamma rays, or the like.

Coating with the Inkjet Ink by Inkjet Method

Inkjet coating methods include various types, depending on how the ink is discharged. Examples of discharge methods include the use of piezoelectric elements, Bubble Jet™ printing, continuous spraying, and electrostatic guidance. The ink of the invention can be jetted by many different methods by suitably selecting the components included in the ink, and the inkjet ink can be applied in a predetermined pattern.

The use of piezoelectric elements is a preferable discharge method for coating with the ink of the invention. A piezoelectric element head is an on-demand inkjet coating head including a nozzle formation substrate having a plurality of nozzles, pressure generating elements composed of a piezoelectric material and an electroconductive material disposed across from the nozzles, and ink that fills the area around these pressure generating elements, in which the pressure generating elements are displaced by applied voltage, which discharges ink droplets from the nozzles.

The inkjet coating apparatus is not limited to one in which the coating head and the ink holder are separate, and may instead be one in which these are inseparably integrated. Also, the apparatus may be one in which the ink holder is separably or inseparably integrated to the coating head, and mounted to a carriage, or one in which the ink holder is provided to a fixed position of the apparatus and ink is supplied to the coating heat through an ink supply member, such as a tube.

Also, when a structure for exerting favorable negative pressure on the coating head is provided to an ink tank, it is possible to employ a configuration in which an absorbent material is disposed in the ink holder of the ink tank, or in which there is a flexible ink holding pouch and a spring that exerts a biasing force on this pouch in a direction in which its internal volume expands, for example. The coating apparatus can employ a serial coating system as discussed above, or may be in the form of a line printer in which coating elements are arranged over an area corresponding to the total width of the coating medium.

Formation of Polyamic Acid Film

A substrate is coated with the inkjet ink of the invention by inkjetting using an inkjet coating method, after which the substrate is heated on a hot plate, in an oven, etc., to remove the solvent by evaporation, etc. (that is, it is dried), to form a polyamic acid film.

The heating conditions will vary with the type and proportions of the various components, but usually involve a temperature of approximately 70 to approximately 120° C., and a polyamic acid film is formed in approximately 5 to approximately 15 minutes in an oven, or in approximately 1 to approximately 5 minutes on a hot plate.

Formation of Polyimide Film

After the polyamic acid film has been formed, it is heat treated at approximately 180 to approximately 350° C., and preferably approximately 200 to approximately 300° C., for approximately 30 to approximately 90 minutes when an oven is used, or for approximately 5 to approximately 30 minutes when a hot plate is used, to imidize the polyamic acid and obtain a polyimide film.

When the polyamic acid film is formed in a pattern, then a patterned polyimide film is formed. As used herein, the term "polyimide film" shall encompass a patterned polyimide film unless otherwise specified.

The polyimide film obtained in this manner is an insulating film with excellent heat resistance and electrical insulating properties. Also, if the raw material inkjet ink includes an epoxy resin (C), then the carboxylic acid of the polyamic acid will react with the epoxy resin simultaneously with the above-mentioned imidization, which is favorable in that the resulting insulating film will be relatively tough and have excellent chemical resistance, flatness, adhesion, and sputtering resistance.

Film Substrate

The film substrate of the invention is obtained, for example, by coating a substrate, such as a polyimide film on which wiring has been formed by inkjetting or another such method, with the inkjet ink of the invention by inkjet coating method over the entire surface or in a specific pattern (such as lines), and then drying the substrate and further heating it to form a polyimide film.

Electronic Component

For example, a flexible electronic component covered by an insulating polyimide film is obtained by coating a film substrate, such as a polyimide film on which wiring has been formed, with the inkjet ink of the invention by inkjet coating method, and then drying this film substrate and further heating it.

EXAMPLE

The invention will now be described through examples and comparative examples, but the invention is not limited to or by these examples.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The names of the compound having two or more acid anhydride groups (a1), diamine (a2), monoamine (a3), and solvent (B) used in the examples and comparative examples are indicated by symbols. These symbols will be used in the following description.

Compound Having Two or More Acid Anhydride Groups (a1):
 i. 3,3',4,4'-diphenyl ether tetracarboxylic dianhydride ("ODPA");
 ii. 3,3',4,4'-benzophenonetetracarboxylic dianhydride ("BTDA"); and
 iii. 2,2-[bis(3,4-dicarboxyphenyl)]hexafluoropropane dianhydride ("6FDA").

Diamine (a2):
 i. 3,3'-diaminodiphenylsulfone ("DDS");
 ii. A compound expressed by Formula (3) above, where $R^3$ and $R^4$ are both a methyl, $R^5$ is a methylene, x is 3, and y is a mixture of about 10 to 15, and the average molecular weight is 1000 (trade name "FM3311," made by Chisso) ("FM3311");
 iii. p-phenylenediamine ("PDA");
 iv. 2,2-bis[4-(4-aminophenoxy)phenyl]hexafluoropropane ("HFBA"); and
 v. A compound expressed by the Formula (10) ("7H2H")

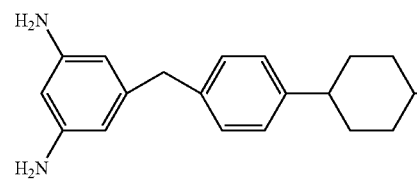

(10)

Monoamine (a3):
 i. 3-aminopropyltriethoxysilane ("S330").

Compound Having One Acid Anhydride Group (a4):
 i. triethoxysilylpropylsuccinic anhydride ("TESA").

Solvent (B):
 i. diethylene glycol methylethyl ether ("EDM");
 ii. N-methyl-2-pyrrolidone ("NMP"); and
 iii. gamma-butyrolactone ("GBL").

Example 1

Inkjet Ink 1

Raw materials were supplied as shown in Table 1 to a 500 mL four-necked flask equipped with a thermometer, a stirrer, a raw material feed port, and a nitrogen gas introduction port. The contents were stirred for 5 hours at 40° C. under a dry nitrogen gas flow, which gave a 25 wt % solution of polyamic acid that was transparent and pale yellow in color. The viscosity of this solution was 9.6 mPa·s (25° C.). The weight average molecular weight was measured by GPC and found to be 2,100. This solution by itself was used as inkjet ink 1.

The viscosity of the solution was measured with an E-type viscometer (Visconic ELD made by Tokyo Keiki). The weight average molecular weight of the polyamic acid was found by diluting the resulting polyamic acid with tetrahydrofuran (THF) so that the concentration of polyamic acid would be approximately 1 wt %, measuring by GPC using a JASCO Gulliver 1500 (intelligent differential refractometer RI-1530) made by the JASCO Corporation, and using the above-mentioned dilute solution as a developer, thereby measured in terms of polyethylene. Four columns were used, namely, G4000HXL, G3000HXL, G2500HXL, and G2000HXL columns made by Tosoh, which were connected in that order. The column temperature was 40° C. and the flow rate was 1.0 mL/minute during measurement.

Example 2

Inkjet Ink 2

Raw materials were supplied as shown in Table 1 to the four-necked flask used in Example 1, and the contents were stirred for 5 hours at 40° C. under a dry nitrogen gas flow, which gave a 25 wt % solution of polyamic acid. This solution by itself was used as inkjet ink 2.

The viscosity and weight average molecular weight of this inkjet ink 2 were measured under the same conditions as in Example 1. As a result, the viscosity was 7.3 mPa·s (25° C.), and the weight average molecular weight was 3400.

Examples 3 to 11

Inkjet Inks 3 to 11

Other than supplying the raw materials as shown in Table 1, inkjet inks were prepared under the same conditions as in Example 1, and these were used as inkjet inks 3 to 11.

The viscosity at 25° C. of the inkjet inks 3 to 11 thus obtained was measured under the same conditions as in Example 1. Also, the water content of the inkjet inks 3 to 11 was measured with a KF Titrino 787 moisture meter (Karl Fisher method) made by Metrohm-Shibata. These measurement results are given in Table 1.

Comparative Example 1

Inkjet Ink C1

Raw materials were supplied as shown in the following table to the 500 mL four-necked flask used in Example 1, and the contents were stirred for 10 hours at 40° C. under a dry nitrogen gas flow, after which the temperature was raised to 70° C. and the contents were stirred for 8 hours to reduce the viscosity, which gave an 8 wt % solution of polyamic acid that was transparent and yellow. This solution by itself was used as inkjet ink C1.

The viscosity of this inkjet ink C1 was measured under the same conditions as in Example 1. As a result, the viscosity was 9.1 mPa·s (25° C.).

With the inkjet ink C1, the reaction product precipitated when EDM was used as the solvent, so NMP was used, and the weight average molecular weight as measured by GPC was 25,000.

| ODPA | 20.0 g |
|------|--------|
| DDS  | 16.0 g |
| NMP  | 414.0 g |

Example 12

Formation of Polyimide Film 12

Using the inkjet ink 1 produced in Example 1, a polyimide substrate was coated in lines and spaces having a width of 500 μm and a length of 5 cm with a Nano Jet R2R inkjet coating

TABLE 1

| | Inkjet Ink | (a1) | (a2) | (a3) | (a4) | (B) | | Viscosity (mPa·s) | Water Content (ppm) |
|---|---|---|---|---|---|---|---|---|---|
| Ex. 1 | 1 | ODPA 28.0 g | DDS 5.6 g | S330 30.0 g | — | EDM 190.8 g | | 9.6 | — |
| Ex. 2 | 2 | ODPA 28.0 g | FM3311 22.6 g | S330 30.0 g | — | EDM 241.8 g | | 7.3 | — |
| Ex. 3 | 3 | ODPA 28.0 g | DDS 5.6 g | S330 30.0 g | — | EDM 95.4 g | GBL 95.4 g | 12.3 | 1710 |
| Ex. 4 | 4 | ODPA 28.0 g | DDS 5.6 g | S330 30.0 g | — | EDM 56.8 g | GBL 133.6 g | 13.5 | 1780 |
| Ex. 5 | 5 | ODPA 25.4 g | 7H2H 10.0 g | S330 27.1 g | — | EDM 56.8 g | GBL 133.6 g | 12.9 | 1870 |
| Ex. 6 | 6 | BTDA 28.1 g | DDS 5.4 g | S330 29.0 g | — | EDM 93.8 g | GBL 93.8 g | 16.7 | 1910 |
| Ex. 7 | 7 | BTDA 26.0 g | 7H2H 9.8 g | S330 26.7 g | — | EDM 93.8 g | GBL 93.8 g | 14.0 | 1830 |
| Ex. 8 | 8 | 6FDA 33.1 g | DDS 4.6 g | S330 24.8 g | — | EDM 93.8 g | GBL 93.8 g | 10.5 | 2250 |
| Ex. 9 | 9 | 6FDA 30.6 g | HFBA 8.9 g | S330 22.9 g | — | EDM 93.8 g | GBL 93.8 g | 12.5 | 2130 |
| Ex. 10 | 10 | ODPA 6.2 g | DDS 19.8 g | — | TESA 36.5 g | EDM 93.8 g | GBL 93.8 g | 11.5 | 1920 |
| Ex. 11 | 11 | ODPA 7.5 g | PDA 10.5 g | — | TESA 44.4 g | EDM 93.8 g | GBL 93.8 g | 13.5 | 1890 |

In Table 1: (a1): compound having two or more acid anhydride groups; (a2): diamine; (a3): monoamine; (a4): compound having one acid anhydride group; and (B): solvent.

apparatus made by DGI. Coating was performed just one time, and the jetting speed from the nozzles was 10 times per second. The substrate was dried for 5 minutes at 80° C. on a hot plate, after which it was heated for 30 minutes in a 250° C. oven, which gave an insulating polyimide film 12 formed in a line pattern.

The line width and edge straightness of the polyimide film thus obtained were observed with an optical microscope, and the film thickness was measured. The thickness here was the average value of measurements made at three points using an α Step 200 film thickness measurement probe made by KLA-Tencor Japan. The results are shown in Table 2. The line width at the time of coating was maintained substantially without change, the edge straightness of the lines was good, and the lines were of sufficient thickness.

Example 13

Formation of Polyimide Film 13

Other than using the inkjet ink 2 produced in Example 2, the polyimide film 13 was obtained under the same conditions as in Example 12.

The polyimide film thus obtained was evaluated under the same conditions as in Example 12. The results are shown in Table 2. The line width at the time of coating was maintained substantially without change, the edge straightness of the lines was good, and the lines were of sufficient thickness.

TABLE 2

|  | Inkjet ink | Line width (μm) | Film thickness (μm) |
|---|---|---|---|
| Example 12 | 1 | 530 | 2.4 |
| Example 13 | 2 | 510 | 2.2 |

Examples 14 to 22

Formation of Polyimide Films 14 to 22

Using the inkjet inks 3 to 11 prepared in Examples 3 to 11, a glass epoxy resin board clad on both sides with copper and having a thickness of 1.5 mm was coated at normal temperature (25° C.) with lines 5 cm long, at a one-dot width and with the dot pitch set to 40 microns, using a DMP-2831 inkjet coating apparatus made by Fujifilm Dimatix. The heater of the inkjet head was switched off, the piezoelectric voltage was 16 V, and the drive frequency was 5 kHz. The substrate was dried for 5 minutes on an 80° C. hot plate, after which it was heated for 30 minutes in a 230° C. oven, which gave insulating polyimide films 14 to 22 formed in a line pattern.

The line width of the polyimide films 14 to 22 obtained by coating with the inkjet inks 3 to 11, and the uniformity of this line width, were observed with an optical microscope, and the film thickness was measured. The thickness here was measured under the same conditions as in Example 12. These results are given in Table 3.

As shown in Table 3, the polyimide films of Examples 14 to 22 had good straightness of the line edges, and the lines had sufficient thickness.

FIG. 1 is an optical micrograph of the polyimide film 21 obtained in Working Example 21.

TABLE 3

|  | Inkjet ink | Line width (μm) | Film thickness (μm) |
|---|---|---|---|
| Example 14 | 3 | 60 | 1.05 |
| Example 15 | 4 | 45 | 1.21 |
| Example 16 | 5 | 60 | 1.04 |
| Example 17 | 6 | 50 | 1.33 |
| Example 18 | 7 | 55 | 1.21 |
| Example 19 | 8 | 50 | 1.10 |
| Example 20 | 9 | 45 | 1.15 |
| Example 21 | 10 | 90 | 1.15 |
| Example 22 | 11 | 80 | 1.25 |

Comparative Example 2

Formation of Polyimide Film C2

Other than using the inkjet ink C1 produced in Comparative Example 1, the polyimide insulating film C2 was obtained under the same conditions as in Example 12.

The polyimide film C2 thus obtained was evaluated under the same conditions as in Example 12. As a result, the line width of the polyimide film C2 was 610 to 680 μm, meaning that the lines spread out considerably from their width at the time of coating. Also, the edge straightness of the lines of the resulting polyimide film C2 was inadequate, and the lines were jagged. The film thickness of the lines of the resulting polyimide film C2 was 0.4 μm, meaning that the lines were not thick enough.

Example 23

Inkjet Ink 12

The inkjet ink 12 was prepared under the same conditions as in Working Example 1, except that the raw materials were supplied in the amounts shown below, and they were supplied in the form of a 30% solution. The viscosity and water content were measured under the same conditions as in Example 3. The viscosity of this solution was 12.1 mPa·s (40° C.), and the water content was 1,750 ppm.

Other than setting the temperature of the heater of the inkjet head to 40° C., using the resulting inkjet ink 12, the polyimide film was obtained and the line width and film thickness were measured under the same conditions as in Example 14. As a result, the line width was 55 μm, the film thickness was 1.22 μm, and the lines had sufficient thickness.

| ODPA | 27.5 g |
|---|---|
| DDS | 5.5 g |
| S330 | 29.5 g |
| EDM | 87.5 g |
| GBL | 87.5 g |

INDUSTRIAL APPLICABILITY

Examples of how the invention can be put to use include as an insulating film for a flexible wiring board, and an electronic component in which this insulating film is used.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. An inkjet ink comprising a polyamic acid (A) having structural units expressed by Formula (1):

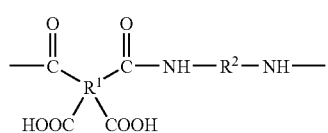

wherein $R^1$ and $R^2$ are each independently a $C_2$ to $C_{100}$ organic group; and having at least one molecular terminal group selected from the group of molecular terminal groups expressed by Formulas (21) and (22):

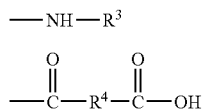

wherein $R^3$ and $R^4$ are each independently a $C_2$ to $C_{100}$ organic group; and a solvent (B), wherein the inkjet ink comprises 20 to 60 weight parts of the polyamic acid (A) per 100 weight parts ink jet ink, and the viscosity of the ink is 1 to 50 mPa·S at 25° C., and the polyamic acid (A) has a weight average molecular weight of 1,000 to 4,500.

2. The inkjet ink according to claim 1, wherein the solvent (B) comprises less than or equal to approximately 20 wt % amide-based solvent with respect to the total solvent weight.

3. The inkjet ink according to claim 2, wherein the solvent (B) is at least one solvent selected from the group consisting of ethyl lactate, ethanol, ethylene glycol, propylene glycol, glycerol, diethylene glycol dimethyl ether, diethylene glycol diethyl ether, diethylene glycol methylethyl ether, diethylene glycol monoethyl ether acetate, ethylene glycol monobutyl ether, ethylene glycol monoethyl ether acetate, propylene glycol monomethyl ether acetate, methyl 3-methoxypropionate, ethyl 3-ethoxypropionoate, cyclohexanone, and gamma-butyrolactone.

4. The inkjet ink according to claim 1, wherein the solvent (B) does not include an amide-based solvent.

5. The inkjet ink according to claim 1, further comprising an epoxy resin (C).

6. The inkjet ink according to claim 5, wherein the epoxy resin (C) is at least one compound selected from the group consisting of N,N,N',N'-tetraglycidyl-m-xylenediamine, 1,3-bis(N,N-diglycidylaminomethyl)cyclohexane, N,N,N', N'-tetraglycidyl-4,4'-diaminodiphenylmethane, and compounds expressed by the Formulas (4) to (7):

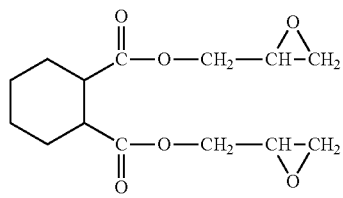

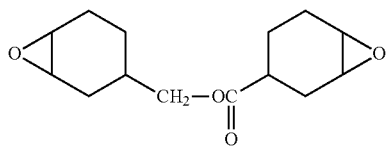

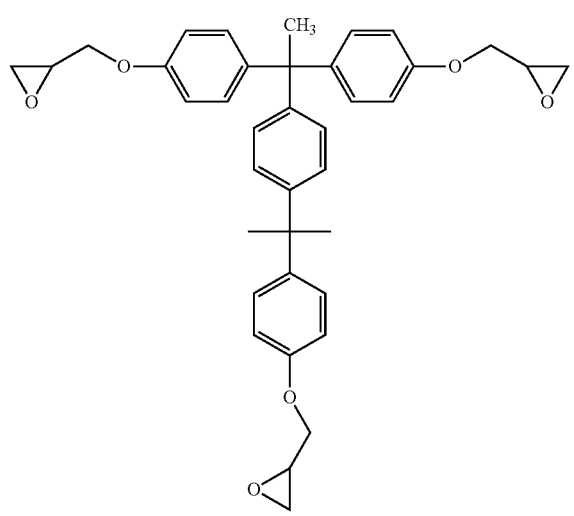

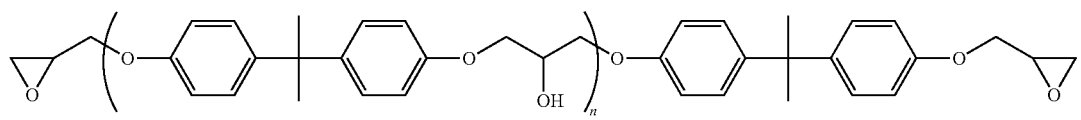

wherein n is an integer from 0 to 10.

7. The inkjet ink according to claim 1, wherein the inkjet ink comprises approximately 20 to approximately 55 weight parts of the polyamic acid (A) per 100 weight parts inkjet ink.

8. The inkjet ink according to claim 1, wherein the inkjet ink comprises approximately 20 to approximately 50 weight parts of the polyamic acid (A) per 100 weight parts inkjet ink.

9. The inkjet ink according to claim 1, having a water content of approximately 10,000 ppm or less.

10. The inkjet ink according to claim 1, having a water content of approximately 5,000 ppm or less.

11. An inkjet ink comprising a polyamic acid (A) having structural units expressed by Formula (1):

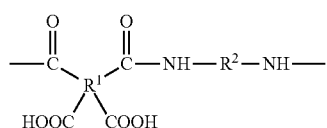

(1)

wherein $R^1$ and $R^2$ are each independently a $C_2$ to $C_{100}$ organic group; and having at least one molecular terminal group selected from the group of molecular terminal groups expressed by Formulas (21) and (22):

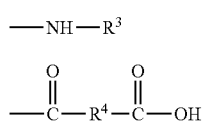

(21)

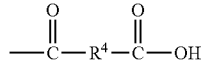

(22)

wherein $R^3$ and $R^4$ are each independently a $C_2$ to $C_{100}$ organic group;

and a solvent (B), wherein the inkjet ink comprises 20 to 60 weight parts of the polyamic acid (A) per 100 weight parts ink jet ink, and the polyamic acid (A) has a weight average molecular weight of 1,000 to 4,500.

12. The inkjet ink according to claim 11, wherein the solvent (B) comprises less than or equal to approximately 20 wt % amide-based solvent with respect to the total solvent weight.

13. The inkjet ink according to claim 12, wherein the solvent (B) is at least one solvent selected from the group consisting of ethyl lactate, ethanol, ethylene glycol, propylene glycol, glycerol, diethylene glycol dimethyl ether, diethylene glycol diethyl ether, diethylene glycol methylethyl ether, diethylene glycol monoethyl ether acetate, ethylene glycol monobutyl ether, ethylene glycol monoethyl ether acetate, propylene glycol monomethyl ether acetate, methyl 3-methoxypropionate, ethyl 3-ethoxypropionoate, cyclohexanone, and gamma-butyrolactone.

14. The inkjet ink according to claim 11, wherein the solvent (B) does not include an amide-based solvent.

15. The inkjet ink according to claim 11, further comprising an epoxy resin (C).

16. The inkjet ink according to claim 15, wherein the epoxy resin (C) is at least one compound selected from the group consisting of N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, and compounds expressed by the Formulas (4) to (7):

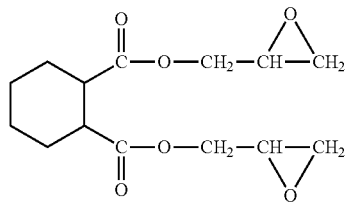

(4)

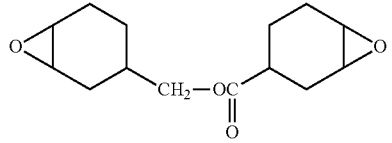

(5)

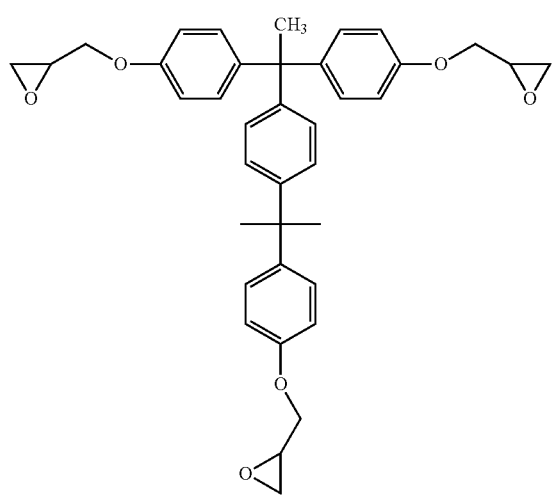

(6)

-continued
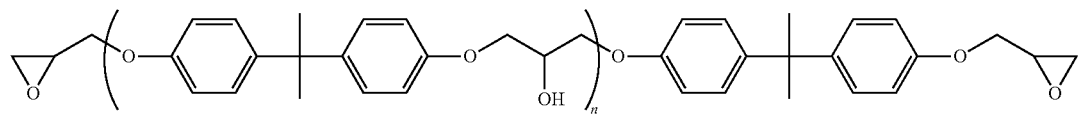 (7)
wherein n is an integer from 0 to 10.